US008082549B2

(12) United States Patent  
Corley, Jr. et al.

(10) Patent No.: US 8,082,549 B2  
(45) Date of Patent: Dec. 20, 2011

(54) SYSTEM, METHOD AND APPARATUS FOR ALLOCATING RESOURCES BY CONSTRAINT SELECTION

(75) Inventors: Herbert W. Corley, Jr., Arlington, TX (US); Jay M. Rosenberger, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1061 days.

(21) Appl. No.: 11/934,753

(22) Filed: Nov. 3, 2007

(65) Prior Publication Data

US 2008/0134193 A1 Jun. 5, 2008

Related U.S. Application Data

(60) Provisional application No. 60/857,729, filed on Nov. 8, 2006.

(51) Int. Cl.
*G06F 9/46* (2006.01)
*G06F 15/18* (2006.01)
*G06E 1/00* (2006.01)
*G06E 3/00* (2006.01)
*G06G 7/00* (2006.01)

(52) U.S. Cl. ............................ 718/104; 718/100; 706/19
(58) Field of Classification Search .................. 718/104, 718/100, 101; 710/19
See application file for complete search history.

(56) References Cited

U.S. PATENT DOCUMENTS

| | | | |
|---|---|---|---|
| 4,744,026 A | 5/1988 | Vanderbei | |
| 4,744,027 A * | 5/1988 | Bayer et al. | 705/7.22 |
| 4,744,028 A | 5/1988 | Karmarkar | |
| 4,885,686 A * | 12/1989 | Vanderbei | 700/99 |
| 4,914,563 A * | 4/1990 | Karmarkar et al. | 700/28 |
| 4,924,386 A * | 5/1990 | Freedman et al. | 705/7.37 |
| 5,136,538 A | 8/1992 | Karmarkar et al. | |
| 5,471,408 A * | 11/1995 | Takamoto et al. | 703/2 |
| 6,069,894 A | 5/2000 | Holender et al. | |
| 6,516,313 B1 | 2/2003 | Perry | |
| 7,689,592 B2 * | 3/2010 | Denton et al. | 703/2 |
| 2005/0171826 A1 * | 8/2005 | Denton et al. | 705/8 |

(Continued)

OTHER PUBLICATIONS

Arsham, H., "A Computationally stable solution algorithm for linear programs," Applied Mathematics and Computation (2007), 188:1549-1561.

(Continued)

*Primary Examiner* — Emerson Puente
*Assistant Examiner* — Willy W Huaracha
(74) *Attorney, Agent, or Firm* — Daniel J. Chalker; Edwin S. Flores; Chalker Flores, LLP

(57) ABSTRACT

The present invention provides a system, method and apparatus for allocating resources with a linear programming model comprising an objective function and a set of constraints describing feasible allocations of the resources. The method ranks constraints based on a numerical measure derived from criteria selected from at least a first and second group and selects one or more of the top-ranked constraints. A new problem is determined from the model's objective function, the previously selected constraints, and the newly selected constraints, and a tentative resource allocation is determined based on the new problem. Whenever the tentative resource allocation violates a model constraint not in the current problem, one or more of the top-ranked such violated constraints are selected, and the new problem determination and tentative resource allocation steps are repeated. The resources are allocated according to the tentative resource allocation when it does not violate any model constraints.

24 Claims, 10 Drawing Sheets

U.S. PATENT DOCUMENTS

2006/0171316 A1* 8/2006 El-Sakkout et al. ......... 370/235
2006/0242647 A1* 10/2006 Kimbrel et al. ............. 718/104
2008/0189418 A1* 8/2008 Kimbrel et al. ............. 709/226

OTHER PUBLICATIONS

Bixby, R. E., "Solving real-world linear programs: a decade and more of progress," Operations Research (2002) 50:3-15.

Corley, H. W., et al., "The cosine simplex algorithm," International Journal of Advanced Manufacturing Technology (2006) 27:1047-1050.

COSMOS problem instances, http://ieweb.uta.edu/cosmos/Instances.htm.

Curet, N. "A primal-dual simplex method for linear programs," Operations Research Letters (1993) 13:233-237.

Dare. P., et al., "GPS network design: logistics solution using optimal and near-optimal methods," Journal of Geodesy (2000) 74:467-478.

Forrest, J. J., et al., "Steepest-edge simplex algorithms for linear programming," Mathematical Programming (1992) 57:341-374.

Gill, P. E., et al., "A numerically stable form of the simplex algorithm," Linear Algebra and Its Applications (1973) 7:99-138.

Guerrero-Garcia, P., et al., "Phase I cycling under the most-obtuse-angle pivot rule," European Journal of Operational Research (2005), 167:20-27.

Hu, J.-F., "A note on 'an improved initial basis for the simplex algorithm'," Computers and Operations Research (2007), 34:3397-3401.

Johnson, E. L., et al., "Progress in linear programming-based algorithms for integer programming: an exposition," INFORMS Journal of Computing (2000) 12:2-23.

Karmarkar, M., "A new polynomial-time algorithm for linear programming," Combinatorica (1984) 4:373-379.

Li, H. L., et al., "A linear programming approach for identifying a consensus sequence on DNA sequences," Bioinformatics (2005) 21:1838-1845.

Li, W., "A Basis-Deficiency-Allowing Primal Phase-I Algorithm using the Most-Obtuse-Angle Column Rule," Computers and Mathematics with Applications (2006), 51:903-914.

Myers, D. C., "A Dual Simplex Implementation of a Constraint Selection Algorithm for Linear Programming," Journal of the Operational Research Society (1992), 43:177-180.

OR-library, J.E. Beasley, http://people.brunel.ac.uk/~mastjjb/jeb/info.html.

Pan, P.-Q., "Practical finite pivoting rules for the simplex method," OR Spektrum (1990) 12:219-225.

Pan, P.-Q., "A simplex-like method of with bisection for linear programming," Optimization (1991) 22:717-743.

Pan, P.-Q., "A variant of the dual pivoting rule in linear programming," Journal of Information and Optimization Sciences (1994) 15:405-413.

Pan, P.-Q., "New Non-Monotone Procedures for Achieving Dual Feasibility," Journal of Nanjing University, Mathematical BiQuarterly (1995), 12:155-162.

Pan, P.-Q., "The most-obtuse-angle-row pivot rule for achieving dual feasibility: a computational study," P.-Q. Pan, European Journal of Operational Research (1997) 101:167-176.

Pan, P.-Q., "A basis-deficiency-allowing variation of the simplex method of linear programming," Computers and Mathematics with Applications 36 (1998) 36:33-53.

Rosenberger, J. M., et al., "Rerouting aircraft for airline recovery," Transportation Science (2003) 37:408-421.

Santos-Palomo, A., "The sagitta method for solving linear programs," European Journal of Operational Researxh (2004), 157:527-539.

Santos-Palomo, A., et al., "A non-simplex active-set method for linear programs in standard form," Studies in Informatics and Control (2005) 14:79-84.

Stojkovic, N. V., et al., "Two direct methods in linear programming," European Journal of Operational Research (2001) 131:417-439.

Stone, J. J., "The Cross-Section Method: An Algorithm for Linear Programing," Rand Corporation (1958), P-1490.

Thompson, G. L., et al., "Techniques for Removing Nonbinding Constraints and Extraneous Variables from Linear Programming Problems," Management Science (1966), 12:588-608.

Todd, M. J., "Theory and practice for interior-point methods," ORSA Journal on Computing (1994) 6:28-31.

Todd, M. J., "The many facets of linear programming," Mathematical Programming (2002) 91:417-436.

Vieira, H., et al., "An improved initial basis for the simplex algorithm," Computers and Operations Research (2005) 32:1983-1993.

Zeleny, M. "An external reconstruction approach (ERA) to linear programming," Computers and Operations Research (1986) 13:95-100.

* cited by examiner

VRAD with Bounding Constraint

RAD or VRAD without Bounding Constraint

VRAD without Bounding Constraint

SYSTEM, METHOD AND APPARATUS FOR ALLOCATING RESOURCES BY CONSTRAINT SELECTION

PRIORITY CLAIM AND CROSS-REFERENCE TO RELATED APPLICATIONS

This patent application is a non-provisional application of U.S. provisional patent application Ser. No. 60/857,729 filed on Nov. 8, 2006 and entitled "System, Method and Apparatus for Allocating Resources by Constraint Selection" which is hereby incorporated by reference in its entirety.

FIELD OF THE INVENTION

The present invention relates to resource allocation in systems modeled by mathematical programming problems and more particularly to a system, method and apparatus to solve these problems and yield values of the decision variables that efficiently optimize the associated objective function according to an appropriate criterion.

BACKGROUND OF THE INVENTION

Mathematical programming entails the modeling of some system with an objective function of appropriate system variables that is to be optimized according to an appropriate criterion. Mathematical programming also involves the maximization of some benefit or the minimization of some cost when specific values are assigned to the system decision variables, as well as the determination of optimal decision variables for multiple goals or other mathematical criteria. The function to be optimized is called the objective function. In such problems the decision variables are usually limited to those values in which other functions of the variables must satisfy mathematical equalities or inequalities modeling system restrictions. Each such restriction is called a constraint of the mathematical programming problem, which is sometimes constrained in other ways as well. The collection of such allowable values is called the feasible region of the problem.

Rudimentary mathematical optimization techniques were devised at least as early as Isaac Newton and the development of differential calculus. Mathematical programming is now a field in the mathematical sciences well-developed both theoretically and computationally, as described in such books as Nonlinear Programming: Theory and Algorithms by M. S. Bazaraa et al. (Reference 1), Introduction to Mathematical Programming: Applications and Algorithms by W. Winston et al. (Reference 2), and Model Building in Mathematical Programming by H. P. Williams (Reference 3).

A general mathematical programming problem with m inequality constraints can be stated as the following problem M, where the term "Equation" refers to any numbered mathematical object.

$$\text{maximize: } f(x_1, \ldots, x_n) \quad (1)$$

$$\text{subject to: } g_i(x_1, \ldots, x_n) \leq b_i, i=1, \ldots, m. \quad (2)$$

where:
the objective function is $f(x_1, \ldots, x_n)$ of Equation 1;
$g_i(x_1, \ldots, x_n)$, $i=1, \ldots, m$, of Equation 2 are functions;
$b_i$, $i=1, \ldots, m$, of Equation 2 are given constants; and
the constraints of M are the inequalities of Equation 2.
Problem M may have no solution. This situation usually occurs either because there are no n-dimensional points $(x_1, \ldots, x_n)$ satisfying the constraints of Equation 2 or because the objective function of Equation 1 may be made arbitrarily large for points $(x_1, \ldots, x_n)$ satisfying the constraints of Equation 2.

One application of solving M is the solution of sets of nonlinear equations or inequalites. For example, one may find a solution $(x_1^*, \ldots, x_n^*)$ to the set of nonlinear inequalities $g_i(x_1, \ldots, x_n) \leq b_i$, $i=1, \ldots, m$, of Equation 2 by solving the following nonlinear problem in the n+m dimensional points $(x_1, \ldots, x_{n+m})$:

$$\text{minimize: } (x_{n+1})^2 + \ldots + (x_{n+m})^2$$

$$\text{subject to: } g_i(x_1, \ldots, x_n) + (x_{n+i})^2 = b_i, i=1, \ldots, m.$$

The optimal values $x_1^*, \ldots, x_n^*$ from the optimal solution $(x_1^*, \ldots, x_{n+m}^*)$ to this problem is a solution to the inequalities of Equation 2.

A simple mathematical programming problem with two decision variables x and y, objective function $f(x,y)=x+y$, and constraints $x^2+y^2 \geq 1$, $x^2+y^2 \leq 2$, $x \geq 0$, $y \geq 0$ is $$\text{maximize: } f(x,y)=x+y$$

$$\text{subject to: } x^2+y^2 \geq 1;$$

$$x^2+y^2 \leq 2;$$

$$x \geq 0; \text{ and}$$

$$y \geq 0.$$

The solution in the (x,y) plane is shown in FIG. 1, which is a graphical representation of the feasible region of a two-variable illustrative optimization problem with linear objective function in accordance with the prior art. FIG. 1 shows how the maximum value of the objective function is obtained at the values of the two variables where the objective function with its maximum value intersects the feasible region.

A simple mathematical programming problem with three decision variables (x,y,z); objective function $f(x,y,z)=x+y$; and constraints $x^2-y^2+z^2 \leq 2$, $x^2+y^2+z^2 \leq 0$ is $$\text{maximize: } f(x,y,z)=xy+yz$$

$$\text{subject to: } x^2-y^2+z^2 \leq 2; \text{ and}$$

$$x^2+y^2+z^2 \leq 10.$$

The two solutions of the variables (x,y,z) are shown in FIG. 2, which is a graphical representation of the feasible region of a three-variable illustrative optimization problem with a nonlinear objective function in accordance with the prior art, at the points where the two twisted planes touch the dumbbell-shaped surface. FIG. 2 shows how the maximum value of the objective function is obtained at the values of the two variables where the objective function with its maximum value intersects the feasible region. In particular, FIG. 2 shows how a problem can have more than one optimal answer for the values of the variables even though the objective function value of all such answers will be the same.

The best known and most frequently used prior art in the field of mathematical programming is linear programming. A brief NPR story on its initial development can be heard at http://www.npr.org/templates/story/story.php?storyId=4661503.

A linear programming model minimizes or maximizes a linear objective function consisting of a sum of a given constant coefficient times each unknown variable. Each system restriction, or constraint, is also linear. In other words, it is a sum of a given constant coefficient times each unknown variable that is either equal, greater than or equal, or less than or equal to another coefficient. Each variable itself can either be any real number or required to be greater than or equal to zero or less than or equal to zero. In theory, any mathematical programming problem can be approximated to any degree of accuracy by a linear programming model, usually with an enormous number of constraints and variables for a sufficiently accurate approximation, as well as some of these variables further restricted to integer or binary (0 or 1) values.

Consider the general linear programming problem L below with objective function $c_1 x_1 + \ldots + c_n x_n$ of Equation 3 and the constraints the inequalities of Equations 4-5:

$$\text{maximize: } z = c_1 x_1 + \ldots + c_n x_n \quad (3)$$

$$\text{subject to: } a_{i1} x_1 + \ldots + a_{in} x_n \leq b_i, i=1, \ldots, m; \text{ and} \quad (4)$$

$$x_j \geq 0, j=1, \ldots, n. \quad (5)$$

All linear programming problems can be put into this general form. The decision variable $x_j$, $j=1, \ldots, n$, might be the amount of product j (or activity j) requiring $a_{ij}$ units of resource i to be produced (or allocated) when there are only $b_i$, $i=1, \ldots, m$, units of resource i available. The objective is to maximize the gain (or profit) $c_1 x_1 + \ldots + c_n x_n$, where $c_j$, $j=1, \ldots, n$, represents the profit per unit of product j. In any given problem L, the $c_j$, $a_{ij}$ and $b_i$ are known constants and the decision variables $x_j$ must be determined to maximize the total gain z, which is not a variable but standard notation for the objective function $f(x_1, \ldots, x_n)$. Problem L does not have a solution if either there are no points $(x_1, \ldots, x_n)$ satisfying the constraints of Equations 4-5 or the objective function of Equation 3 can be made arbitrarily large for $(x_1, \ldots, x_n)$ satisfying the constraints of Equations 4-5.

Problem L can be written in matrix form as $$\text{maximize: } z = c^T x$$

$$\text{subject to: } Ax \leq b; \text{ and}$$

$$x \geq 0.$$

where:
x is an n×1 vector of variables $x_j$, $j=1, \ldots, n$;
A is an m×n matrix $[a_{ij}]$ with 1×n transposed rows $a_i^T$, $i=1, \ldots, m$;
b is an m×1 vector;
c is an n×1 vector; and
0 is an n×1 vector of zeros.

The constraint $a_i^T x \leq b_i$ determines a hyperplane, which is here the set of n-dimensional points $\{x: a_i^T x = b_i\}$. Thus any feasible point x to problem L must lie in the closed half-space $\{x: a_i^T x \leq b_i\}$.

Problem L is called the primal linear programming problem here. The dual linear programming problem DL of L can be written as $$\text{minimize: } w = b^T y$$

$$\text{subject to: } A^T y \geq c; \text{ and}$$

$$y \geq 0.$$

where:
y is an m×1 vector of variables;
$A^T$ is the transpose of the m×n matrix A of L with 1×m transposed columns $(a_j)^T$, $j=1, \ldots n$;
b is an m×1 vector;
c is an n×1 vector; and
0 is an m×1 vector of zeros.

The constraint $(a^j)^T y \geq c_j$ determines a hyperplane, which here is the set of m-dimensional points $\{y: (a^j)^T y = c_j\}$. Thus any feasible point y to problem DL must lie in the closed half-space $\{y: (a^j)^T y \geq c_j\}$. From the duality theory of linear programming in Linear Programming and Network Flows by M. S. Bazaraa, et al. (Reference 4), an important relationship between the primal problem L and its dual DL is that if either has an optimal solution, then the optimal value z* of L equals the optimal w* of DL. In other words, the primal L can be solved by obtaining a solution to its dual DL.

Similarly, there is a more complicated Lagrangian dual problem DM to the nonlinear primal problem M as discussed in Nonlinear Programming: Theory and Algorithms by M. S. Bazaraa et al. (Reference 1). DM reduces to DL for linear programming. More generally, when the function $f(x_1, \ldots, x_n)$ is concave, the functions $g_i(x_1, \ldots, x_n)$, $i=1, \ldots, m$, are convex as defined in Reference 1, and a solution exists to M, then the optimal objective function value for M equals that of DM. If any of the functions do not satisfy these properties but a solution to M exists, then the optimal objective function value for M may be smaller than that of DM.

A linear programming problem with two variables $x_1$ and $x_2$ is $$\text{maximize: } z = 3x_1 + 5x_2$$

$$\text{subject to: } x_1 \leq 4;$$

$$x_2 \leq 6;$$

$$3x_1 + 2x_2 \leq 18; \text{ and}$$

$$x_1, x_2 \geq 0.$$

Its feasible region and solution are shown in FIG. 3, where the normals to the three hyperplanes determining the constraints of Equation 4 of L are the vectors $a_1 = (1, 0)^T$, $a_2 = (1, 0)^T$, and $a_3 = (3, 2)^T$. The normal vector to the objective function of Equation 3 is $c = (3, 5)^T$. Observe that the optimal point (2,6) is determined in this two-dimensional feasible region by the two constraints with normals $a_1$ and $a_3$, which are most nearly parallel c. FIG. 3 is a graphical representation of geometry of linear programming problems in accordance with the prior art. For a two-variable illustrative problem, it shows the extreme points (i.e., corners or vertices) of the feasible region and how the maximum value of the objective function is always obtained at an extreme point that is the point of intersection of the feasible region and the objective function at its maximum value.

In general, mathematical programming problems and linear programming problems model situations in real physical or abstract systems. The reason for solving these mathematical models is to obtain optimum values for the system decision variables. These optimal values are then used to construct or operate the underlying system that was modeled and hence to make significant real-world decisions.

A major proportion of all scientific computation is devoted to linear programming. As noted in Linear Programming 1: Introduction, G. B. Dantzig, et al. (Reference 5), the applications of linear programming arise in a broad range of technological, scientific, and industrial areas, including:

1. Resource allocation: optimal amounts of a resource allocated to different tasks;
2. Mixture selection: optimal oil mixtures or portfolio selection, for example;
3. Distribution: optimal amounts of commodities distributed to different locations;
4. Networks: optimal paths or flows or the construction of networks;
5. Game theory: the determination of optimal mixed strategies in two-person, zero-sum games, as well as other types of games.

6. Integer programming: linear programming problems with the additional requirement that some or all of the variables must have integer values, where the major computational step in the solution is linear programming;

7. Binary (0-1) integer programming: linear programming problems with the additional requirement that variables can have only the values 0 or 1 to model yes/no decisions, for example, where the major computational step in the solution is often linear programming;

8. Assignments: optimal assignment of item i to class j using 0-1 programming to maximize some benefit or minimize some cost, where a variable $x_{ij}=1$ if item i is assigned to class j and $x_{ij}=0$ otherwise;

9. The solution of a set of linear equations or inequalities by linear programming, particularly when the variables are required to be nonnegative;

10. The solution of linear Diophantine equations (i.e., linear equations in which the variables are required to be integers) by integer programming;

11. The approximate solution of M, and hence systems of nonlinear equations and inequalities, by approximating a nonlinear equation with many linear ones with additional variables and constraints (including 0-1 integer restrictions); and 12. The approximate solution of M, and hence systems of nonlinear equations and inequalities, by approximating a nonlinear surface by a set of discrete point in n dimensions along with additional variables and constraints, then using 0-1 or integer programming.

The significance of these applications is illustrated by the use of linear programming in Application 3, resource allocation, which refers to the optimal allocation of specific technological resources to achieve particular technological results. Examples include the scheduling of airline flights and the assignment of aircraft and crews to these flights, the determination of the product mix for a factory, and the deployment of military personnel and equipment. Factories use linear programming models for scheduling production and controlling inventory levels to satisfy product demand, as well as minimizing production and inventory costs. A communications system routes telephone traffic through a transmission network so demand is satisfied, no transmission links are overloaded, and transmission costs are minimized (Reference 6). Electricity is similarly dispersed. Large organizations such as military units or hospitals can minimize the cost of diet for soldiers or patients while satisfying nutritional requirements.

In linear programming application 11 listed above, nonlinear functions are linearized to obtain an approximate solution to a nonlinear mathematical programming problem. For example, FIG. 4 is a graphical representation of the approximation of a continuous function of one variable by a piecewise linear function to illustrate that linear programming can apply to nonlinear optimization problems in accordance with the prior art.

Linear programming has been studied for over sixty years. The best known prior art approach for solving L is the simplex algorithm, developed in the 1947 by Dantzig (Reference 7), provided the first effective solution procedure and remains the underlying algorithm used by many commercial linear programming and virtually all integer programming packages. It starts from some initial extreme point (i.e., corner or vertex) of the feasible region of L. The simplex method then proceeds on the exterior of the feasible region, which is a polytope as defined in Reference 4, from one extreme of the feasible region to another with a value of the objective function at least as good until an optimal extreme point is reached as depicted in FIG. 5, which is a graphical representation of the geometry in three variables of the prior art known as the simplex algorithm for solving the linear programming problem L with three variables. This algorithm starts at some extreme point of the feasible region. The method moves then along the exterior of the polytope defined by the problem's linear constraints from one extreme point to another, with the objective function never decreasing until an optimal extreme point is finally reached. Such an optimal extreme point is guaranteed if the problem has a solution. Unfortunately the computational complexity of the simplex method is not polynomial in the worst case, even though it exhibits polynomial complexity on average, as noted in References 4 and 5.

Khachian's ellipsoid algorithm (Reference 8) solves linear programming problems in polynomial time, but it performs poorly in practice. More recently, Dikin (References 9, 10), Karmarkar (Reference 11), and others developed a polynomial projection approach that evolved to various polynomial interior-point barrier-function methods (References 12-15) used in some large-scale applications. FIG. 6 is a graphical representation of the geometry of the prior art of interior-point algorithms for solving a linear programming problem L with two variables. An interior-point algorithm starts at some interior point of the feasible region (i.e., the polytope defined by problem's linear constraints). It then proceeds from one interior point to another in the interior of the feasible region with the objective function increasing until an optimal solution is obtained on the exterior of the polytope. This optimal solution may not be an extreme point. However, an optimal extreme point with the same optimal value of the objective function can be obtained by a further process called the "crossover" step.

In contrast to the simplex method, interior-point methods do not allow efficient post-optimality analysis for solving the binary and integer linear programming problems of most industrial applications. Such binary and integer problems are NP-hard. In other words, no polynomial algorithm has been found to solve general binary and integer linear programming problems. This fact means that no solution to large problems of this type has been heretofore achieved in a sufficiently small computation time to approach "real time" in a commercial sense.

Solving such binary and integer linear programming models represent the principal computational use of linear programming, so simplex methods remain the dominant approach. However, there is no single best algorithm for solving L. For any current method, we can always formulate an instance of problem L for which the method performs poorly (References 13, 14). As a result, there is a need for a system, method and apparatus for more efficiently allocating resources via linear programming.

SUMMARY OF THE INVENTION

The present invention relates to the computational solution of mathematical programming problems that are used as models to make optimal decisions in scientific, technical, industrial, and military environments, as well as to solve systems of equations and inequalities. Existing methods to solve such problems are not adequate in many situations. In particular, emerging technologies require (i) computer solutions in real time when possible and (ii) algorithms with efficient memory usage for problems involving millions of constraints or variables. Examples include updating airline schedules as weather conditions and passenger loads change (Reference 16), finding an optimal driving route using real-time traffic data from global positioning satellites (Reference 17), and detecting problematic repeats in DNA sequences (Reference 18).

The present invention is a generally applicable method that can be used to solve mathematical programming models in scientific, technological, industrial, and military applications. In brief, the present invention is a method for solving tractable cases such as L of the general mathematical programming problem M by considering a series of smaller problems with fewer constraints than the original problem. The goal of this approach is to solve such problems with less computation, hence with greater speed, than current methods in many important applications to satisfy the increasing demand for immediate solutions.

The present invention provides a system, method and apparatus for solving mathematical programming problems in which the size of the mathematical problem is reduced by considering a series of smaller problems. For a maximization problem M defined by Equations 1, 2 (and similarly, with appropriate changes by those skilled in the state of the art, for a minimization criterion in Equation 1 and/or some equalities in Equation 2 and/or the reversal of some inequalities in Equation 2) or for a maximization problem L defined by Equations 3-5 (and similarly, with appropriate changes by those skilled in the state of the art, for a minimization criterion in Equation 3 and/or some equalities in Equation 4 and/or the reversal of some inequalities in Equation 4 and/or the reversal or removal of some inequalities in Equation 5), the method begins with an initial problem formed from the original problem's objective function and at least one constraint, possibly ones not in the original constraints to bound the feasible region without eliminating the optimum allocation of resources to the original problem. The method then considers a series of problems obtained by adding one or more relevant constraints to the previous problem by evaluating at least the two constraint selection factors termed Factors I, II and defined below. The influences of all constraint selection factors are aggregated into one numerical measure termed the constraint selection metric. The constraint selection metric is used to rank the relevant constraints and, based on this ranking, to select one or more of these constraints for addition to the previous problem. The constraint selection factors are also referred to as criteria selected from a first group (i.e., Factor I) and from a second group (i.e., Factor II).

Factor I is the angle formed either by the gradient of a constraint not in the previous problem or by a vector obtained from some suitable mathematical combination of the gradients for multiple constraints not in the previous problem with the gradient of the objective function at some relevant point, which may be the optimum to the previous problem. Factor II is the reduction of the feasible region of the previous problem by adding one or more relevant constraints to eliminate the solution to the previous problem but not the solution to the original problem. Factors I, II may be explicit in the constraint selection metric to someone skilled in the state of the art, or they may be used by someone skilled in the state of the art in a mathematical derivation of the constraint selection metric. Factors I, II may be represented by different aspects of the mathematical formula or derivation of the formula for the constraint selection metric, or more than one of the Factors I, II may be represented by the same aspect of the mathematical formula or derivation of the formula for the constraint selection metric. The constraint selection metric involving Factors I, II, as well any other factors, is chosen to predict the likelihood that a constraint will be satisfied as equality at the optimal solution to M if one exists. If a solution to one of this series of problems satisfies all the model constraints, the original problem M is solved. Hence, only a small fraction of the original constraints may be used in the series of problems. Any such embodiment of this new method is called a Constraint Optimal Selection Technique (COST). In particular, the new approach can be applied to linear programming and hence integer and binary (0, 1 values only) linear programming problems as a means of solving large-scale problems.

For example, the present invention provides a method for allocating resources with a linear programming model comprising an objective function and a set of constraints that describe feasible allocations of the resources. The method includes the steps of ranking the constraints according to a constraint selection metric based on at least one criterion selected from a first group and at least one criterion selected from a second group, selecting one or more of the top-ranked constraints, determining a new problem by adding the selected constraints to the previous problem, and determining a tentative resource allocation based on the new function. Whenever the tentative resource allocation violates at least one of the original model constraints not in the previous problem, the method selects one or more of the top-ranked violated constraints, then repeats the new problem determination and tentative resource allocation determination steps. The resources are allocated in accordance with the tentative resource allocation whenever the tentative resource allocation does not violate any of the model constraints. The constraint selection metric for selecting the top-ranked constraints may be independent of any tentative solution and occur once at the beginning of the method. Alternatively, the constraint selection metric for selecting the top-ranked constraints violated by the tentative solution may explicitly involve the tentative solution so that such violated constraints are ranked each time a tentative solution is obtained. Alternatively, the top-ranked violated constraints can be selected sometimes from a ranking not involving the tentative solution and sometimes on a ranking involving the tentative solution. Note that the method can be implemented using a computer program embodied on a computer readable medium wherein the steps are performed by one or more code segments.

In addition, the present invention provides an apparatus for allocating resources using a linear programming model comprising an objective function and a set of constraints that describe feasible allocations of the resources. The apparatus includes a memory, an input/output interface and a processor communicably coupled to the memory and the input/output interface. The controller includes a memory, an input/output interface and a processor communicably coupled to the memory and the input/output interface. The input/output interface (a) receives data regarding the objective function, the set of constraints and the resources, and (b) transmits data or instructions to allocate the resources. The processor (a) ranks the constraints according to a constraint selection metric based on at least one criterion selected from a first group and at least one criterion selected from a second group, (b) selects one or more of the top-ranked constraints, (c) determines a new problem by adding the selected constraints to the previous problem, (d) determines a tentative resource allocation based on the new problem, (e) whenever the tentative resource allocation violates at least one of model constraints, selects one or more of the top-ranked violated constraints, and repeats the new problem determination and tentative resource allocation determination, and (f) provides data or instructions to the input/output interface to allocate the resources in accordance with the tentative resource allocation whenever the tentative resource allocation does not violate any of the model constraints and is thus optimal for the model.

The present invention also provides a system for allocating resources using a linear programming model comprising an objective function and a set of constraints that describe feasible allocations of the resources. The system includes two or more resources, a controller, and one or more devices to allocate the resources in accordance with data or instructions received from the controller. The controller includes a memory, an input/output interface and a processor communicably coupled to the memory and the input/output interface. The input/output interface (a) receives data regarding the objective function, the set of constraints and the resources, and (b) transmits data or instructions to allocate the resources. The processor (a) ranks the constraints according to a constraint selection metric based on at least one criterion selected from a first group and at least one criterion selected from a second group, (b) selects one or more of the top-ranked constraints, (c) determines a new problem by adding the selected constraints to the previous problem, (d) determines a tentative resource allocation based on the new problem, (e) whenever the tentative resource allocation violates at least one of model constraints, selects one or more of the top-ranked violated constraints, and repeats the new problem determination and tentative resource allocation determination, and (f) provides data or instructions to the input/output interface to allocate the resources in accordance with the tentative resource allocation whenever the tentative resource allocation does not violate any of the model constraints and is thus optimal for the model.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
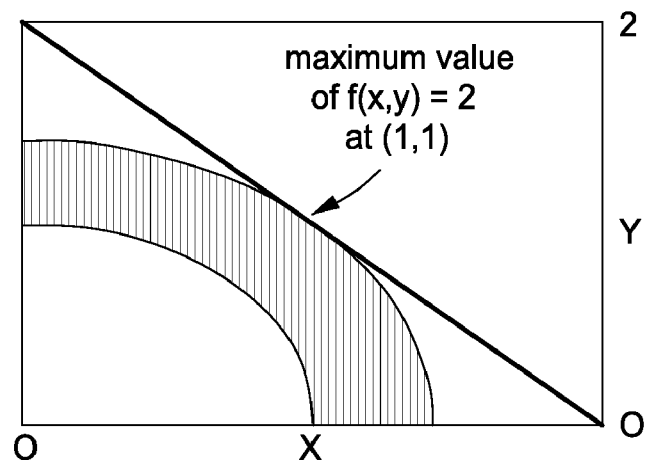
FIG. 1 is a graphical representation of the feasible region of a two-variable illustrative optimization problem with a linear objective function in accordance with the prior art.
Figure 2:
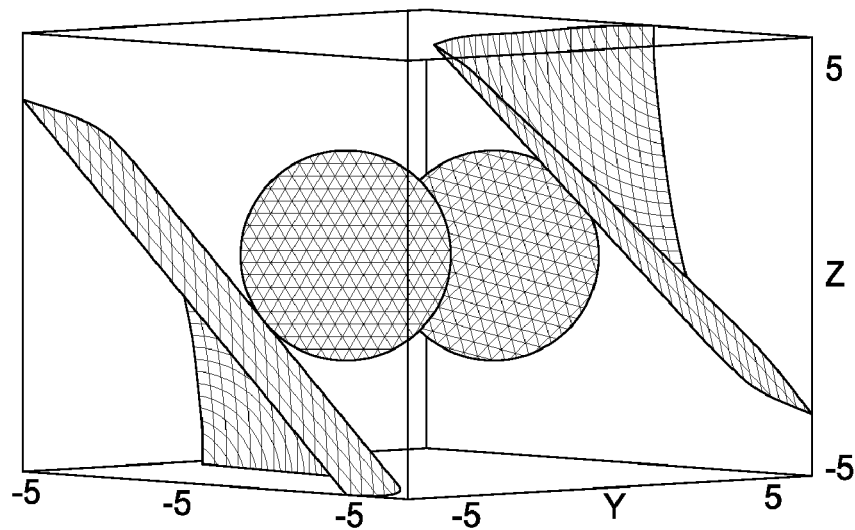
FIG. 2 is a graphical representation of the feasible region of a three-variable illustrative optimization problem with a nonlinear objective function in accordance with the prior art.
Figure 3:
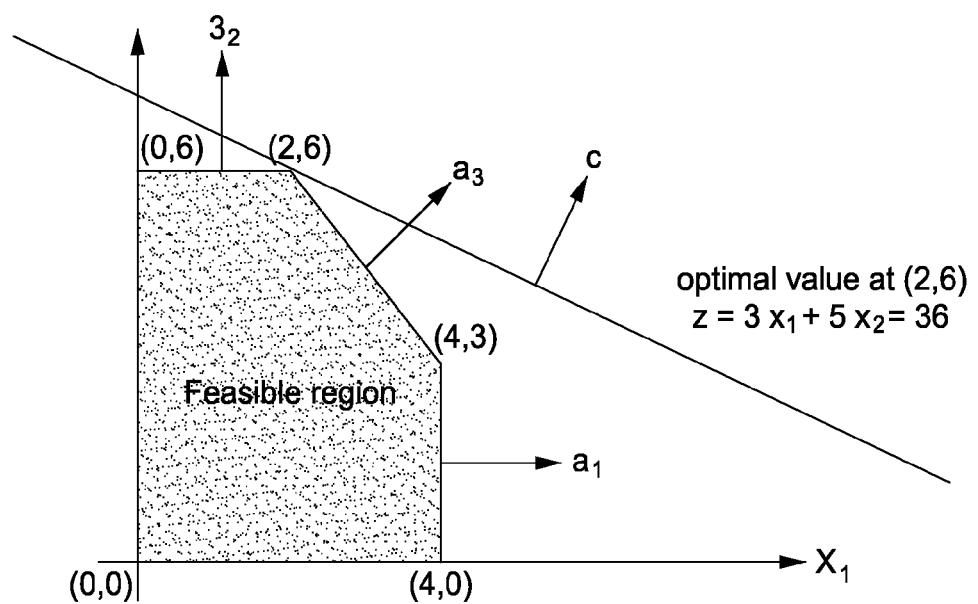
FIG. 3 is a graphical representation of geometry in two variables of a linear programming problems in accordance with the prior art.
Figure 4:
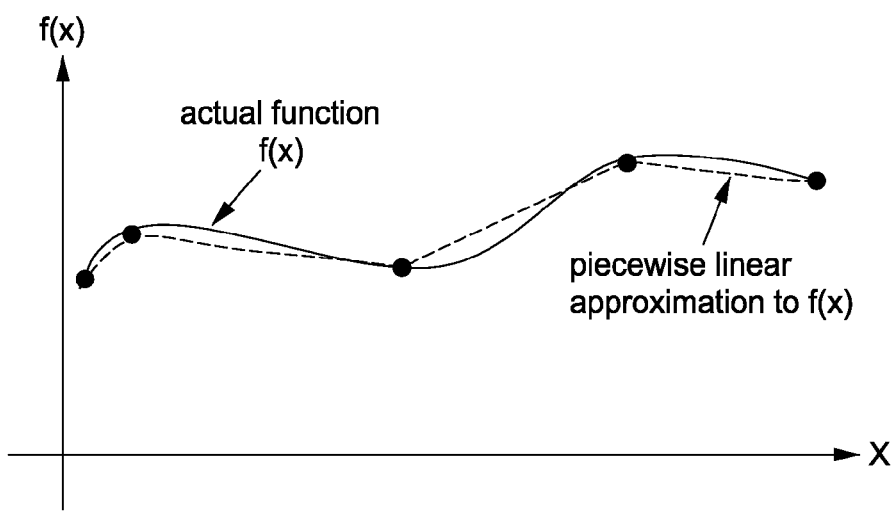
FIG. 4 is a graphical representation of the approximation of a continuous function of one variable by a piecewise linear function to illustrate that linear programming can apply to nonlinear optimization problems in accordance with the prior art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention relates to the computational solution of mathematical programming problems which are used as models to make optimal decisions in scientific, technical, industrial and military environments, as well as to solve systems of equations and inequalities. Existing methods to solve such problems are not adequate in many situations. In particular, emerging technologies require (i) computer solutions in real time and (ii) algorithms with efficient memory usage for problems involving millions of constraints or variables. Examples include updating airline schedules as weather conditions and passenger loads change (Reference 16), finding an optimal driving route using real-time traffic data from global positioning satellites (Reference 17), and detecting problematic repeats in DNA sequences (Reference 18).

The present invention is a generally applicable method that can be used to solve mathematical programming models in scientific, technological, industrial, and military applications. In brief, the present invention is a method for solving the mathematical programming problem M and special cases such as L by considering a series of smaller problems with fewer constraints than the original problem. The goal of this approach is to solve such problems with less computation, hence with greater speed, than current methods in many important applications to satisfy the increasing demand for immediate solutions.

The present invention provides a system, method and apparatus for solving mathematical programming problems in which the size of the mathematical problem is reduced by considering a series of smaller problems. For a maximization problem M defined by Equations 1, 2 (and similarly, with appropriate changes by those skilled in the state of the art, for a minimization criterion in Equation 1 and/or some equalities in Equation 2 and/or the reversal of some inequalities in Equation 2) or for a maximization problem L defined by Equations 3-5 (and similarly, with appropriate changes by those skilled in the state of the art, for a minimization criterion in Equation 3 and/or some equalities in Equation 4 and/or the reversal of some inequalities in Equation 4 and/or the reversal or removal of some inequalities in Equation 5), the method begins with an initial problem formed from the original problem's objective function and at least one constraint, possibly artificial ones not in the original constraints to bound the feasible region without eliminating the optimum to the original problem. The method then considers a series of problems obtained by adding one or more relevant constraints to the previous problem by evaluating at least the two constraint selection factors termed Factors I, II and defined below. The influences of all constraint-selection factors are aggregated into one numerical measure termed the constraint selection metric. The constraint selection metric is used to rank the relevant constraints and, based on this ranking, to select one or more of these constraints for addition to the previous problem. The constraint selection factors are also referred to as criteria selected from a first group (i.e., Factor I) and from a second group (i.e., Factor II).

Factor I is the angle formed either by the gradient of a constraint not in the previous problem or by a vector obtained from some suitable mathematical combination of the gradients for multiple constraints not in the current problem with the gradient of the objective function at some relevant point, which may be the optimum to the previous problem. Factor I is the angle formed either by the gradient of a constraint not in the previous problem or by a vector obtained from some suitable mathematical combination of the gradients for multiple constraints not in the previous problem with the gradient of the objective function at some relevant point, which may be the optimum to the previous problem. Factor II is the reduction of the feasible region of the previous problem by adding one or more relevant constraints to eliminate the solution to the previous problem but not the solution to the original problem. Factors I, II may be explicit in the constraint selection metric to someone skilled in the state of the art, or they may be used by someone skilled in the state of the art in a mathematical derivation of the constraint selection metric. Factors I, II may be represented by different aspects of the mathematical formula or derivation of the formula for the constraint selection metric, or more than one of the Factors I, II may be represented by the same aspect of the mathematical formula or derivation of the formula for the constraint selection metric. The constraint selection metric involving Factors I, II, as well any other factors, is chosen to predict the likelihood that a constraint will be satisfied as equality at the optimal solution to M or L if one exists. If a solution to one of this series of problems satisfies all the model constraints, the original problem M or L is solved. Hence, only a small fraction of the original constraints may be used in the series of problems. Any such embodiment of this new method is called a Constraint Optimal Selection Technique (COST). In particular, the new approach can be applied to linear programming and hence integer and binary linear programming problems as a means of solving large-scale problems.

As mentioned above, other factors or additional criterion can be selected in addition to selecting the criterion from the first group and the second group. For example, the additional criterion may include (i) a total decrease in a value of the new function, either independent or dependent on the tentative solution, upon adding one or more inoperative constraints, (ii) a rate of decrease in the value of the new function, either independent or dependent on the tentative solution, upon adding one or more inoperative constraints, (iii) the scaling of all relevant constraints in such a way that their influence on the constraint selection metric is commensurate but their possible reduction of the feasible region of the previous problem is not affected by this scaling, or (iv) a combination thereof.

The present invention of Constraint Optimal Selection Techniques (COSTs) will first be discussed for the mathematical programming problem M and then for the important special case, linear programming problem L. Several embodiments of COSTs for L will be presented, as well as a use in the integer programming problem I. Finally, a typical industrial situation will be modeled by binary (0-1) integer programming to demonstrate this application.

A method and apparatus for solving the general mathematical programming problem M, if a solution exists, is described in which the size of the mathematical problem is reduced by considering a series of smaller problems. The rationale for a COST applied to M is that a solution is determined by relatively few constraints of Equation 2 satisfied as equalities (i.e., active or binding).

For a maximization problem M defined by Equation 1 and Equation 2 (and similarly, with appropriate changes by those skilled in the state of the art, for a minimization criterion in Equation 1 and/or some equalities in Equation 2 and/or the reversal of some inequalities in Equation 2), the method begins with an initial problem formed from the original problem's objective function and at least one constraint, possibly artificial ones to bound the feasible region without eliminating the optimum to M. Any constraints of $M_1$ from Equation 2 are chosen according constraint selection factors described below for selecting constraints for problems $M_2, M_3, \ldots, M_t$.

In general, a COST then considers a series of problems $M_1, \ldots, M_t$, where problem $M_{r+1}$ is obtained from $M_r$, $r= 1, \ldots, t-1$, by adding one or more of the original constraints of M not in the previous problem $M_r$ according to a criterion evaluating the following two factors, as well as possibly others, where the influences of all such constraint-selection factors are aggregated into one numerical constraint selection metric, chosen to predict the likelihood that a constraint or constraints will be satisfied as equality at the optimal solution to M if one exists.

Figure 7:
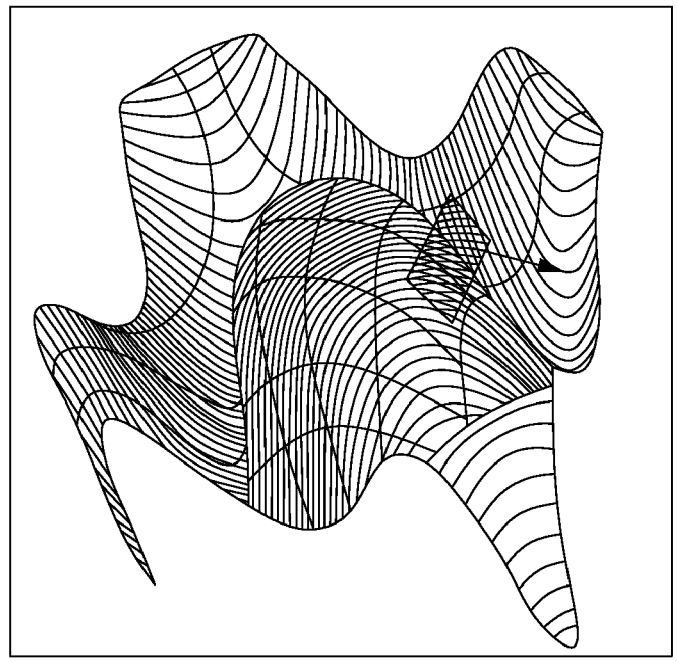
FIG. 7 is a graphical representation of the normal of the gradient to a nonlinear constraint gradient at a point in Factor I in accordance with the present invention.

Factor I is the angle formed either by the gradient of a constraint not in problem $M_r$ or by a vector obtained from some suitable mathematical combination of the gradients for multiple constraints not in $M_r$, with the gradient of the objective function at some relevant point $x_r^*$ representing values $(x_1^*, \ldots, x_n^*)$ of the decision variables, which may be the optimum to problem $M_r$. The gradient of a function at a point on a surface is illustrated in FIG. 7.

Factor II is the reduction of the feasible region of the previous problem by adding one or more relevant constraints to eliminate the solution to the previous problem but not the solution to the original problem.

If some problem $M_t$ is reached for which it can be concluded that no solution exists for M, the method terminates. If a solution to some problem $M_t$ of this series of problems satisfies all the model constraints, the original problem M is solved. Hence, only a small fraction of the original constraints may be used in the series of problems.

Any such embodiment of the present invention is called a Constraint Optimal Selection Technique (COST). If an algorithm for problem M uses a constraint selection metric not invoking both Factor I and Factor II, it is called a pre-COST. Pre-COSTs are not included as part of the present invention.

Factors I, II may be explicit in the constraint selection metric of a COST to someone skilled in the state of the art, or they may be used by someone skilled in the state of the art in a mathematical derivation of the constraint selection metric of a COST. Factors I, II may be represented by different aspects of the mathematical formula or derivation of the formula for the constraint selection metric of a COST, or more than one of the Factors I, II may be represented by the same aspect of the mathematical formula or derivation of the formula for the constraint selection metric of a COST.

In summary, for the mathematical programming problem M, a COST involves a sequence of problems $M_1, \ldots, M_r, \ldots, M_t$, where the COST terminates with $M_t$. $M_1$ consists of the objective function of M subject to at least one constraint, possibly an artificial one to bound the feasible region without eliminating the optimum allocation of resources to the original problem. For example, a constraint for $M_1$ may be an artificial bounding constraint of the form $x_1^2 + \ldots + x_n^2 \leq N$ with a value of the positive number N large enough to include the optimal solution of $M_1$. Or, the constraint or constraints of $M_1$ may be some number chosen from the constraint set Equation 2 according the constraint-selection criterion for a particular COST. In this latter case, if $M_1$ has an unbounded objective function value, this fact will be recognized by the particular solution algorithm applied to it, and further inoperative constraints will be added according to the constraint selection criterion until either M is found not to have a solution or a finite objective function value is obtained.

Any algorithm, currently known or yet to be discovered, for solving a mathematical programming problem can be applied to each $M_r$. The constraints for $M_r$ from Equation 2 are called the operative constraints for $M_r$, while the remainder in Equation 2 are called the inoperative constraints for $M_r$. Any COST generates problem $M_{r+1}$ from $M_r$ by adding one or more additional inoperative constraints chosen according to the COST's constraint selection criterion, which aggregates the influences of Factors I, II, and any additional constraint-selection factors into a numerical constraint selection metric, as the violated inoperative constraint or constraints most likely to be satisfied as equality by an optimal solution of M, if one exists.

If M has an optimal solution, then some problem $M_s$, with or without a possible bounding constraint, has an optimal solution $x_s^*$. Thereafter, for each integer $r \geq s$, a solution $x_r^*$ is obtained for $M_r$. For any integer $t \geq s$ for which $x_t^*$ satisfies all inoperative constraints of $M_t$, then $x_t^*$ solves M and the procedure terminates usually with only a small fraction of the original constraints of Equation 2 used in the series of problems. If M does not have a solution, such a problem $M_t$ does not exist.

COSTs are divided into three classes: Prior COSTs, Posterior COSTs, and Mixed COSTs. Any Prior COST adds an inoperative constraint or constraints to $M_r$ according to its constraint selection criterion. However, a Prior COST calculates its constraint selection metric for each constraint only once while the constraint set (2) is being initially read by the computer program. A Prior COST is termed Prior because this constraint selection metric for each constraint of Equation 2 is independent of the solution $x_r^*$ to the current $M_r$ and available before $x_r^*$ is obtained. Hence, a Prior COST uses information about the constraints but not information at $x_r^*$. By comparison, a Posterior COST uses a constraint selection metric for each violated inoperative constraint of Equation 2 evaluated at the solution $x_r^*$ to the current $M_r$. Thus a Posterior COST is termed Posterior because it uses information for all violated inoperative constraints after $x_r^*$ is obtained. A Mixed COST is a COST that for some $M_r$ uses information for at $x_r^*$ its constraint selection metric but for other $M_r$ does not use information at $x_r^*$ for its constraint selection metric.

A COST may be applied to the dual optimization problem DM of M as described in Reference 1, as well as the primal problem M. Under certain regularity conditions, adding constraints to the dual is equivalent to adding variables to the primal problem. By considering both primal and dual at the same time, a series of problems with fewer variables and constraints than the original primal problem can lead to a solution of the primal.

An important embodiment of COSTs is the application to a special case of L defined as a nonnegative linear programming NL. This form of linear programming problems is the model most often used as a model in industrial applications as a means of solving large-scale problems with enormous numbers of constraints and variables, possibly millions or more in some industrial models (Reference 19). In a nonnegative linear programming problem NL, all the coefficients $a_{ij}$, $i=1, \ldots, m$, $j=1, \ldots, n$, in Equation 4 are nonnegative, while all the $c_j$, $i=1, \ldots, m$, $j=1, \ldots n$, and $b_i$, $i=1, \ldots, m$, are strictly positive. Significantly, it is easy to establish that any NL with feasible allocations has an unbounded objective function value if and only if some column $a^j$ of A is a zero vector.

In this embodiment, the rationale for a COST applied to NL, as well as any L, is that a solution is determined by at most n constraints of Equation 4 satisfied as equalities (i.e., active or binding) for a problem NL with n variables.

For the nonnegative linear programming NL, a COST involves a sequence of problems $NL_1, \ldots, NL_r, \ldots, NL_t$, where the COST terminates with $NL_t$. If NL is known to have an optimal solution, $NL_1$ consists of the objective function Equation 3 subject to at least one constraint, possibly an artificial one to bound the feasible region without eliminating the optimum to the original problem NL. For example a constraint for $NL_1$ may be an artificial bounding constraint of the form $x_1 + \ldots + x_n \leq N$ with a value of the positive number N large enough to include the optimal solution of $NL_1$. Or, the constraint or constraints of $NL_1$ may be some number chosen from the constraint set Equation 4 according the constraint-selection criterion for a particular COST. In this case, if $NL_1$ has an unbounded objective function value, this fact will be recognized by the particular solution algorithm applied to it and further inoperative constraints will be added according to the constraint selection criterion until NL is discovered to have no feasible allocations or a finite objective function value is obtained.

The constraints from Equation 4 for $NL_1$ are called the operative constraints for $NL_r$, while the remainder in Equation 4 are called the inoperative constraints for $NL_r$. Any COST generates problem $NL_{r+1}$ from $NL_r$ by adding one or more additional inoperative constraint chosen according to the COST's selection criterion, which aggregates the influences of Factors I, II any additional constraint-selection factors into a constraint-selection metric, as the inoperative constraint or constraints most likely to be satisfied as equality by an optimal solution of NL, if one exists.

Figure 5:
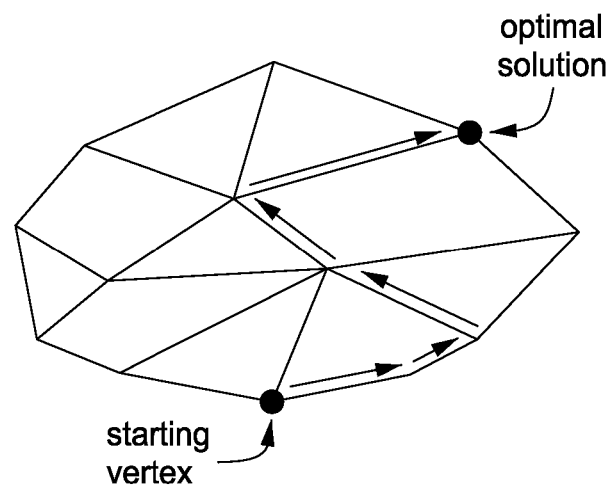
FIG. 5 is a graphical representation of the geometry in three variables of the prior art known as the simplex algorithm for solving linear programming problem L with three variables.
Figure 6:
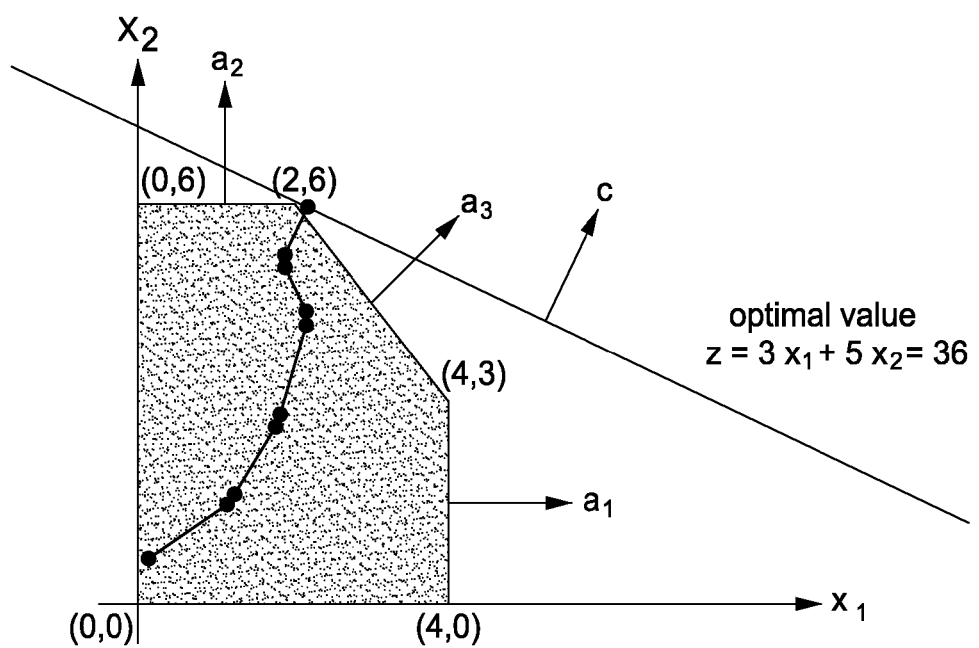
FIG. 6 is a graphical representation of the geometry of the prior art of interior-point algorithms for solving a linear programming problem L with two variables.
Figure 8:
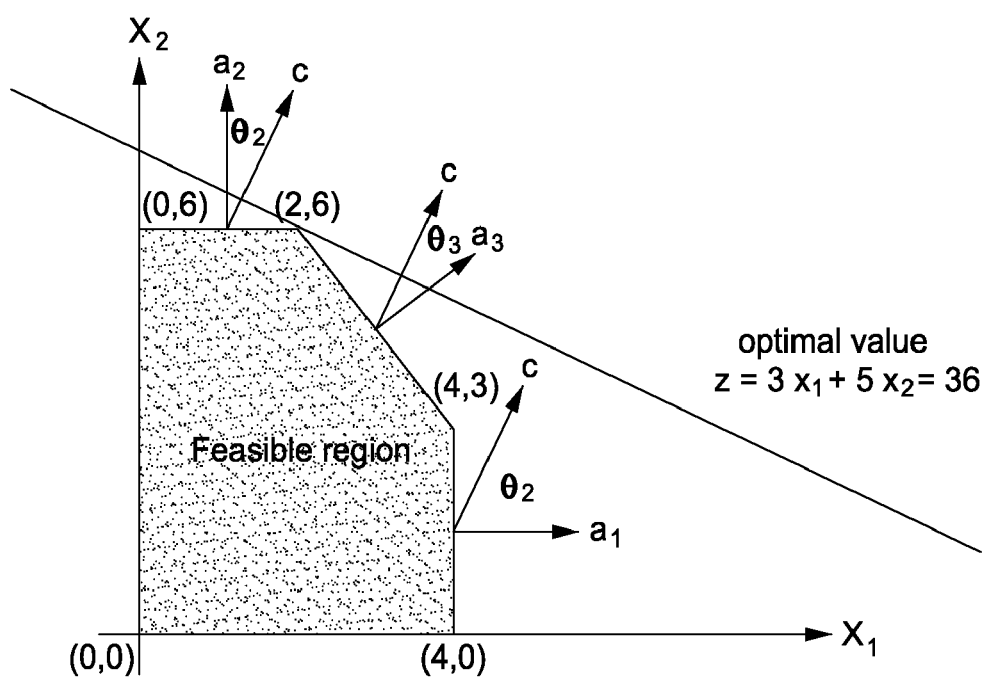
FIG. 8 is a graphical representation of Factor I for the embodiment of COSTs in linear programming in accordance with the present invention.
Figure 9:
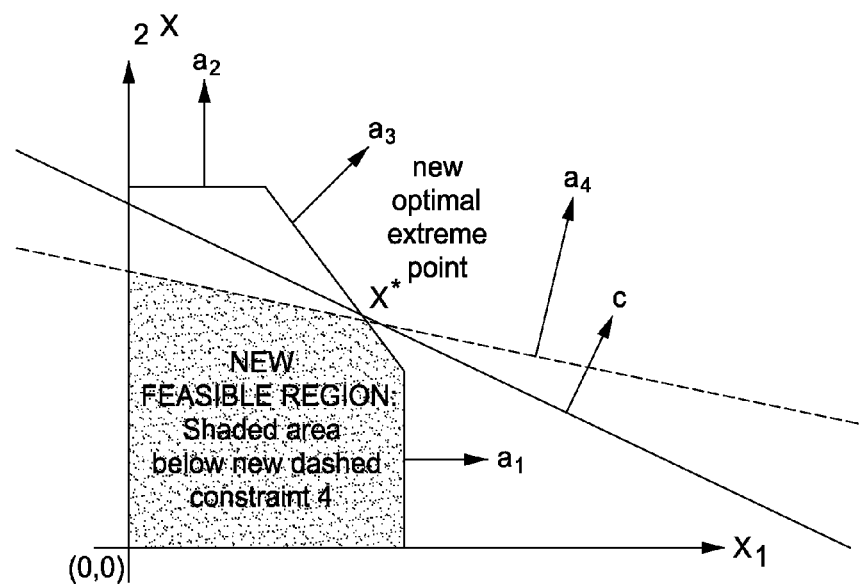
FIG. 9 is a graphical representation of Factors II and III for the embodiment of COSTs in linear programming in accordance with the present invention.

For problem NL, Factors I, II take the following form in determining the likelihood of a constraint or constraints $a_i^T x \leq b_i$ being among the constraints binding at the optimal solution to NL. Factor I is the angle formed either by normal vector $a_i$ of an inoperative constraint for problem $NL_r$ or by a vector obtained from some suitable mathematical combination of the gradients for multiple inoperative constraints for $NL_r$ with the normal c of the linear objective function as a generalization of a class of problems solved by the Schwarz inequality in abstract Hilbert spaces in Linear Operator Theory in Engineering and Science by A. Naylor, et al. (Reference 20). For example, FIG. 8 is a graphical representation of Factor I for the embodiment of COSTs in linear programming in accordance with the present invention. FIG. 8 illustrates the angle between the normals $a_i$ of individual constraint with c in a two-dimensional nonnegative linear programming problem. Factor II is the reduction of the feasible region of problem $NL_r$ upon adding an inoperative constraint or constraints of problem $NL_r$, either independent or dependent on some relevant point $x_r^*$, representing values $(x_1^*, \ldots, x_n^*)$ of the decision variables. This point $x_r^*$ is usually the optimum to problem $NL_r$, but it is not necessarily so. FIG. 9 is a graphical representation of Factor II for an embodiment of COSTs in linear programming in accordance with the present invention. FIG. 9 shows the reduction of the feasible region of FIG. 5 when a single linear constraint 4 is added to the constraints of Equation 4 to the problem represented by FIG. 5.

Any algorithm, currently known or yet to be discovered, for solving a linear programming problem can be applied to each $NL_r$. The dual simplex algorithm described in Linear Programming and Network Flows by M. S. Bazaraa, et al. (Reference 4) is usually used. It can quickly solve a problem $NL_{r+1}$ from the solution to $NL_r$. If NL has a solution, eventually some $NL_s$ is reached that has a solution $x_s^*$ that would remain a solution if any bounding constraints added for $LN_1$ were removed. Thereafter, for each integer $r \geq s$, a solution $x_r^*$ is obtained for each $NL_r$. For any integer $t \geq s$ for which $x_t^*$ satisfies all inoperative constraints of $NL_t$, then $x_t^*$ solves NL and the procedure terminates. If NL does not have a solution, eventually some $NL_t$ is obtained for which this fact is learned, say, from the dual simplex algorithm.

The immediate motivation for the present invention was the pre-COST COS developed for L in Corley et al. (Reference 21). This algorithm invokes only Factor I. It is based solely on the cosine of the angle between the $a_i$ of an individual constraint and c, also called the cosine criterion.

Other prior art includes the active-set non-simplex baisis deficient methods of References 22 and 23. The linear programming pre-COST of Zeleny (Reference 24) begins with an artificial constraint constructed from a sum of the given constraints but invokes only Factor II by using the violation $a_i^T x^* - b_i$ of an inoperative constraint $a_i^T x \leq b_i$ to rank violated inoperative constraints. In addition, the linear programming pre-COST of Adler et al. (Reference 25) adds constraints in their original order. In related work, Curet (Reference 26) solves linear programs by adding a single row to the basis at a time (i.e., adds an additional constraint to a previous relaxed problem) but does not use Factor I or Factory II.

Other prior art involving simplex pivot rules involving the cosine criterion includes the work of Pan (References 27-32) and Stoljkovic and Stanimirovic (Reference 33). Forrest and Goldfarb (Reference 34) uses a variation of Factor I in their steepest-edge rule for determining the entering basic variable in the simplex method. This rule appears to be the current rule of choice the entering basic variable in the simplex method (Reference 13). In addition, Trigos et al. (Reference 35) and Veiera et al. (Reference 36) use the cosine criterion to get an initial basis for the simplex method after eliminating all redundant constraints.

As compared to the prior art described above with respect to References 13 and 21-36, constraint selection invoking both Factor I and Factor II provides a distinct computational advantage.

Two specific COSTs for NL developed for this patent application and not in the public domain are known as RAD and VRAD. RAD is a Prior COST, while VRAD is a Posterior COST.

One version of RAD uses a bounding constraint $x_1 + \ldots + x_n \leq N$ as the only constraint of $NL_1$. Then for $NL_{r+1}$, a single inoperative constraint is added that maximizes the RAD constraint selection metric $$\frac{a_i^T c}{b_i}$$

among all inoperative constraints $a_i^T x \leq b_i$ that are violated at an optimal extreme point solution $x_r^*$ to $NL_r$. One version of VRAD uses a bounding constraint $x_1 + \ldots + x_n \leq N$ as the only constraint of $NL_1$. Then for $NL_{r+1}$, a single inoperative constraint is added that maximizes the VRAD constraint selection metric $$\frac{a_i^T c}{b_i} \frac{a_i x_r^* - b_i}{\|a_i\|}$$

among all inoperative constraints $a_i^T x \leq b_i$ that are violated at an optimal extreme point solution $x_r^*$ to $NL_r$, where $\|a_i\|$ is the norm of the vector $a_i$. In both RAD and VRAD, the dual simplex algorithm provides $x_{r+1}^*$.

Figure 10:
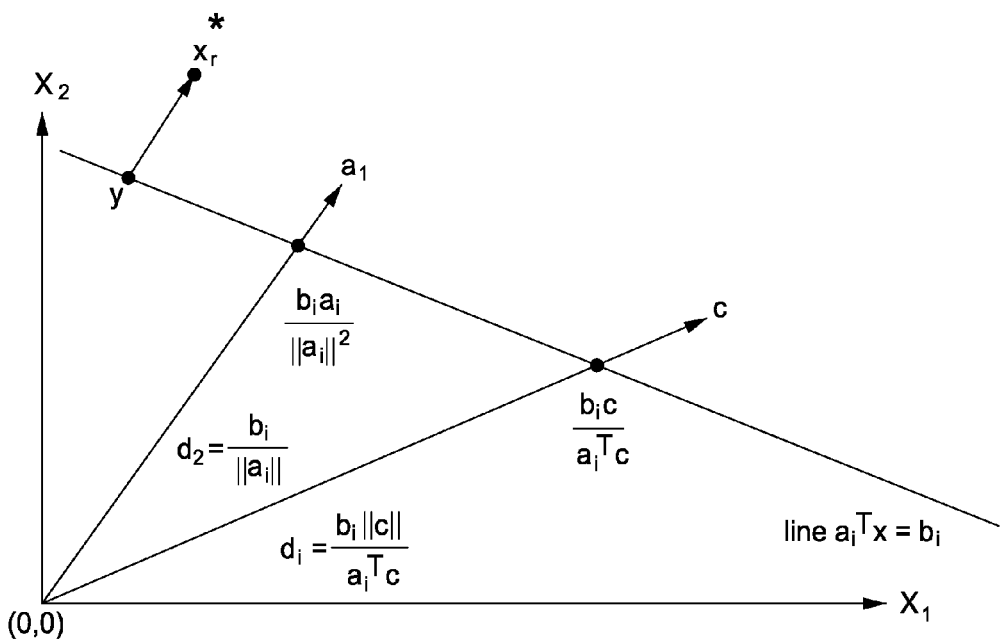
FIG. 10 is a graphical representation of the Prior COST RAD and the Posterior COST VRAD in the embodiment of linear programming problem NL with two variables in accordance with the present invention.

FIG. 10 is a graphical representation of the Prior COST RAD and the Posterior COST VRAD in the embodiment of linear programming problem L with two variables in accordance with the present invention. FIG. 10 shows the geometrical interpretation of these algorithms. For example, the point $$\frac{b_i a_i}{\|a_i\|^2}$$

is the point at which some positive multiple $a_i$ intersects of $a_i^T x = b_i$ for a generic constraint $a_i^T x \leq b_i$. This point is called the $a_i$-point of the constraint $a_i^T x \leq b_i$. Also in FIG. 10, the point $$\frac{b_i c}{a_i^T c}$$

is called the c-point of the constraint $a_i^T x \leq b_i$. For example, the point $$\frac{b_i a_i}{\|a_i\|^2}$$

is the point at which some positive multiple $a_i$ intersects of $a_i^T x = b_i$ for a generic constraint $a_i^T x \leq b_i$. This point $$\frac{b_i a_i}{\|a_i\|^2}$$

is called the $a_i$-point of the constraint $a_i^T x \leq b_i$. Also in FIG. 10, the point $$\frac{b_i c}{a_i^T c}$$

is called the c-point of the constraint $a_i^T x \leq b_i$. Similarly, the point $$\frac{c_j a^j}{\|a^j\|^2}$$

is called the $a^j$-point of the generic constraint $(a^j)^T y \geq c_j$ for NL's dual problem, while $$\frac{c_j b}{(a^j)^T b}$$

is called the b-point of this constraint $(a^j)^T y \geq c_j$ of NL's dual problem.

To one skilled in the art, the $a_i$-points, c-points, and b-points of the previous paragraph completely describe NL and contain all the information required to solve the problem. In fact, the $a_i$-points and c-points alone contain all information needed to implement RAD.

RAD minimizes the value of the objective function $c^T x$ of NL at the c-point of a constraint among all inoperative constraints violated by $x_r^*$. The logic is that the optimal value of $NL_{r+1}$ decreases from that of $NL_r$ when a violated inoperative constraint is added to $NL_r$. The goal of RAD is to achieve the most decrease with as few constraints as possible.

Among all inoperative constraints violated at $x_r^*$, VRAD maximizes the rate of decrease from the optimal extreme point $x_r^*$ to the point y on $a_i^T x = b_i$ (in the direction $-a_i$ from $x_r^*$) per unit distance of $d_2$ of the origin to its $a_i$-point.

Figure 11:
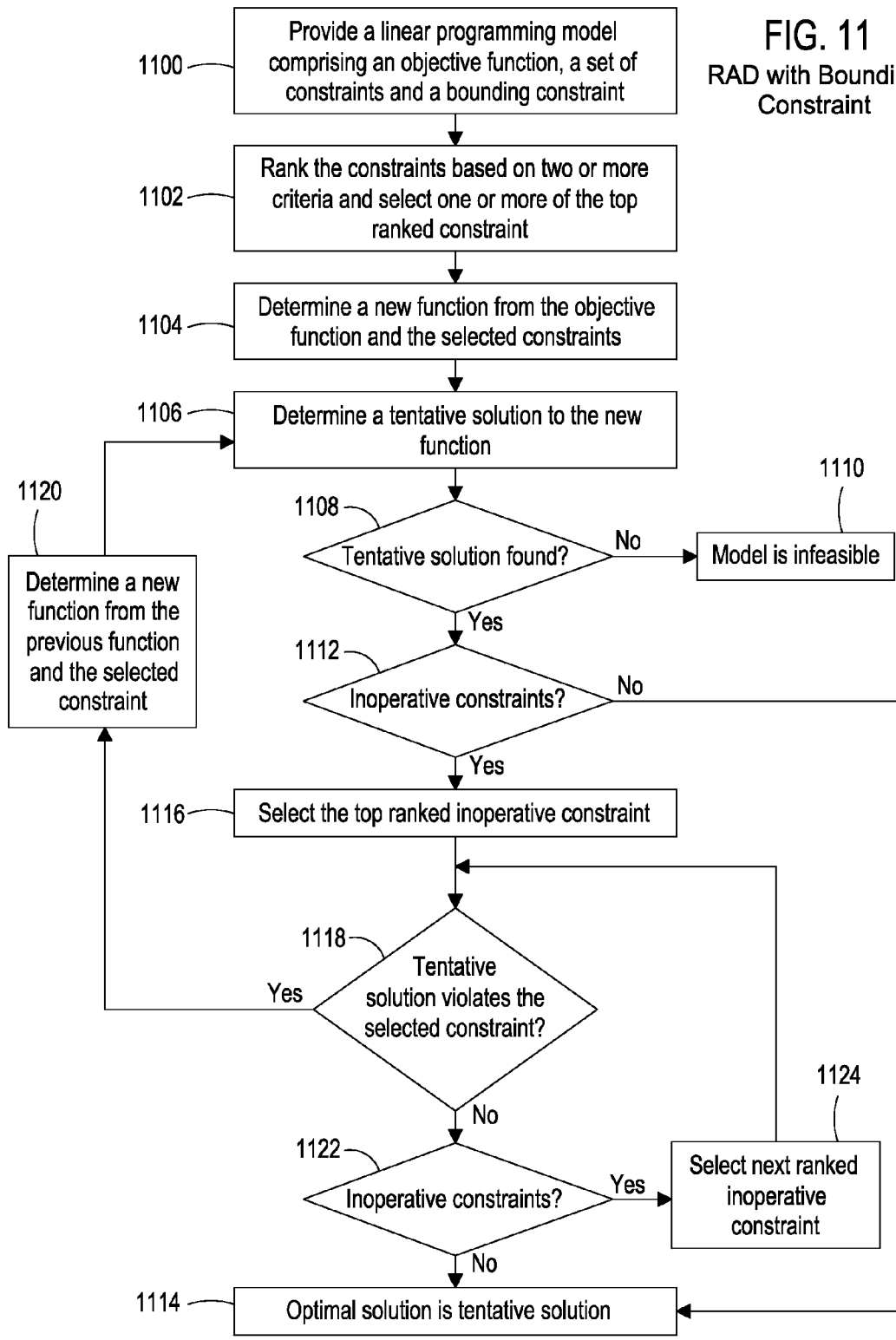
FIG. 11 is a flow chart of the Prior COST RAD in accordance with one embodiment of the present invention.

Now referring to FIG. 11, a flow chart of the Prior COST RAD with a bounding constraint in accordance with one embodiment of the present invention is shown. A linear programming model comprising an objective function, a set of constraints that describe feasible allocations of the resources and one or more bounding constraints are provided in block 1100. The constraints are ranked according to the RAD constraint selection metric based on at least one criterion selected from a first group and at least one criterion selected from a second group, and one or more of the top-ranked constraints are selected in block 1102. As used herein, an inoperative constraint is a model constraint that has not been previously selected. The first group (Factor I) includes the angle formed either by the gradient of a constraint not in the previous problem or by a vector obtained from some suitable mathematical combination of the gradients for multiple constraints not in the current problem with the gradient of the objective function at some relevant point, which may be the optimum to the previous problem. The second group (Factor II) includes the reduction of the feasible region of the previous problem by adding one or more relevant constraints to eliminate the solution to the previous problem but not the solution to the original problem.

A new problem is determined from the objective function and the bounding constraint in block 1104, and a tentative resource allocation is determined for this problem in block 1106. The tentative resource allocation can be determined using a primal simplex method, a dual simplex method or other applicable method. If a tentative solution is not found, as determined in decision block 1108, the model is determined to be infeasible in block 1110. If, however, a tentative solution is found in decision block 1108, and there are no inoperative constraints, as determined in decision block 1112, the optimal solution is the tentative solution and the resources are allocated in accordance with the optimal solution in block 1114. If, however, there are inoperative constraints, as determined in decision block 1112, the top-ranked inoperative constraint is selected in block 1116. If the tentative solution violates the selected constraint, as determined in decision block 1118, a new problem is determined from the previous problem and the selected constraint in block 1120. The process loops back to determine a tentative solution to the new function in block 1106 and continues as previously described. If, however, the tentative solution does not violate the selected constraint, as determined in decision block 1118, and there are no inoperative constraints, as determined in decision block 1122, the optimal solution is the tentative solution and the resources are allocated in accordance with the optimal solution in block 1114. If, however, there are inoperative constraints, as determined in decision block 1122, the next ranked inoperative constraint is selected in block 1124 and the process loops back to determine whether or not the tentative solution violates the selected constraint, as determined in decision block 1118, and continues as previously described. Note that the method can be implemented using a computer program embodied on a computer readable medium wherein the steps are performed by one or more code segments.

In the Prior COST RAD, the objective function can be $z = c^T x$, the one or more constraints can be $a_i^T x \leq b_i$, the tentative solution is the optimal $x_r^*$ for $NL_r$, the constraint selection metric determined by criteria from the first group and the second group comprises $$\left\{ \frac{a_i^T c}{b_i} \,\middle|\, a_i^T x_r^* > b_i \right\}$$

or its mathematical equivalent, and the ranking of the constraints is from a maximum value to a minimum value.

The resource allocation may include (a) optimizing resource allocations, resource amounts, mixture selection, portfolio selection, commodity distribution, performance of a controlled process, paths, flows, networks, or assignment of an item to a class, (b) improving profit, (c) decreasing cost, (d) determining solutions, strategies and equilibria in game theory, (e) determining solutions to a system of linear equations or inequalities, nonlinear equations or inequalities, Diophantine linear equations, or linear equations in which the variables are integers, binary integers, unrestricted in sign or required to be nonnegative, or (f) the approximate solution of any nonlinear mathematical system of equations or inequalities that can be approximated by linearizing the nonlinear system with the possible addition of further linear equations and/or linear inequalities and/or continuous, integer, or 0-1 binary variables, such as a system of partial differential equations and/or inequalities. The linear programming model may include a system of linear equations or inequalities, nonlinear equations or inequalities, Diophantine linear equations, or linear equations in which the variables are unrestricted in sign or required to be nonnegative, as well as variables restricted to integers or only the integers 0 and 1 (binary). The resources may include communication resources, computer resources, electrical resources, transportation resources, military resources, healthcare resources, agricultural resources, natural resources, physical resources, human resources, technological resources, processing resources, industrial resources, or a combination thereof.

The Prior COST RAD can also be illustrated using the following algorithm:

Algorithm 1 RAD

STOP ← False.
OPERATIVE ← {1}. r ← 1.
while STOP = FALSE do

-continued

Algorithm 1 RAD

Using the dual simplex method, solve the following problem to get an optimal solution $x_r^*$ $$\max z = c^T x \quad (6)$$
$$\text{s.t. } a_i^T x \leq b_i \quad \forall i \in \text{OPERATIVE} \quad (7)$$
$$x \geq 0. \quad (8)$$

if $a_i^T x_r^* \leq b_i, \forall i \notin \text{OPERATIVE}$, then
   STOP ← True. The point $x_r^*$ is an optimal solution.
else
   Let $$i^* \in \arg\max_{i \in \text{OPERATIVE}} \text{RAD}(a_i, b_i, c, x_r^*).$$

OPERATIVE ← OPERATIVE ∪ {i*}. r ← r + 1.
end if
end while

The Prior COST RAD, given by Algorithm 1, involves both Factor I and Factor II. RAD's constraint selection criterion generates $NL_{r+1}$ by adding an inoperative constraint of $NL_r$ that is violated by a solution $x_r^*$ of $NL_r$ and that maximizes $$\frac{a_i^T c}{b_i}$$

among all violated inoperative constraints of $NL_r$. Since $b_i > 0$, $c > 0$, $a_i \geq 0$, and $a_i \neq 0$ for NLs, the value $$\frac{a_i^T c}{b_i} > 0.$$

Define $$\text{RAD}(a_i, b_i, c, x) = \left\{ \frac{a_i^T c}{b_i} \,\middle|\, a_i^T x > b_i \right\}.$$

So RAD seeks $$i^* \in \arg\max_{i \notin \text{OPERATIVE}} \text{RAD}(a_i, b_i, c, x_r^*),$$

or equivalently $$i^* \in \arg\max_{i \notin \text{OPERATIVE}} \left\{ \frac{\|a_i\|}{b_i} \cos(a_i, c) \,\middle|\, a_i^T x_r^* > b_i \right\}$$

for each $NL_r$ since $\|c\|$ is the same constant for all elements of $\text{RAD}(a_i, b_i, c, x_r^*)$, where $\cos(a_i, c)$ is the cosine of the angle between the vectors $a_i$ and c. Ties are broken arbitrarily. The term $\cos(a_i, c)$ in $\text{RAD}(a_i, b_i, c, x_r^*)$ invokes Factor I, while $$\frac{\|a_i\|}{b_i}$$

measures Factor II. Thus $$\frac{a_i^T c}{b_i}$$

involves both Factor I and Factor II, and at each iteration RAD seeks a violated inoperative constraint whose c-point is closest to the origin.

Figure 12:
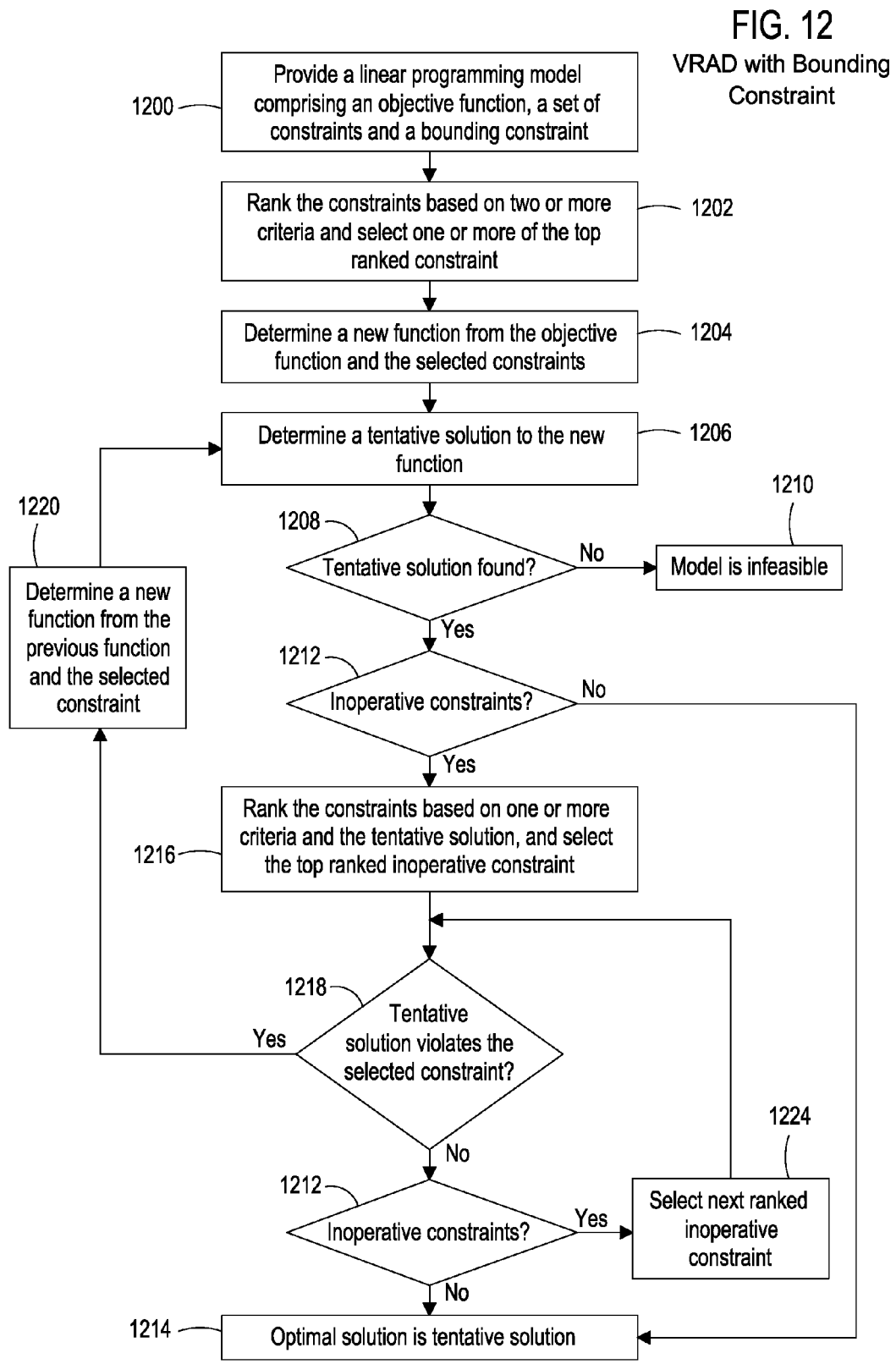
FIG. 12 is a flow chart of the Posterior COST VRAD with a bounding constraint in accordance with one embodiment of the present invention.

Referring now to FIG. 12, a flow chart of the Posterior COST VRAD with a bounding constraint in accordance with one embodiment of the present invention is shown. A linear programming model comprising an objective function, a set of constraints that describe feasible allocations of the resources and one or more bounding constraints are provided in block 1200. As used herein, an inoperative constraint is a model constraint that has not been previously selected. The first group (Factor I) includes the angle formed either by the gradient of a constraint not in the previous problem or by a vector obtained from some suitable mathematical combination of the gradients for multiple constraints not in the current problem with the gradient of the objective function at some relevant point, which may be the optimum to the previous problem. The second group (Factor II) includes the reduction of the feasible region of the previous problem by adding one or more relevant constraints to eliminate the solution to the previous problem but not to the original problem.

A new problem is determined from the objective function and the selected constraints in block 1202 and a tentative resource allocation is determined based on the new problem in block 1204. The tentative resource allocation can be determined using a primal simplex method, a dual simplex method or other applicable method. If a tentative solution is not found, as determined in decision block 1206, the model is determined to be infeasible in block 1208. If, however, a tentative solution is found in decision block 1206, and there are no inoperative constraints, as determined in decision block 1210, the optimal solution is the tentative solution and the resources are allocated in accordance with the optimal solution in block 1212. If, however, there are inoperative constraints, as determined in decision block 1210, the constraints are ranked according to the VRAD constraint selection metric based on the one or more criteria according to the VRAD constraint selection metric based on at least one criterion selected from a first group, at least one criterion selected from a second group, and the tentative solution, and the top-ranked inoperative constraint is selected in block 1214. If the tentative solution violates the selected constraint, as determined in decision block 1216, a new problem is determined from the previous problem and the selected constraint in block 1218. The process loops back to determine a tentative solution to the new problem in block 1204 and continues as previously described. If, however, the tentative solution does not violate the selected constraint, as determined in decision block 1216, and there are no inoperative constraints, as determined in decision block 1220, the optimal solution is the tentative solution and the resources are allocated in accordance with the optimal solution in block 1212. If, however, there are inoperative constraints, as determined in decision block 1220, the next-ranked inoperative constraint is selected in block 1222 and the process loops back to determine whether or not the tentative solution violates the selected constraint, as determined in decision block 1216, and continues as previously described. Note that the method can be implemented using a computer program embodied on a computer readable medium wherein the steps are performed by one or more code segments.

In the Posterior COST VRAD, the objective function can be $z = c^T x$, the one or more constraints can be $a_i^T x \leq b_i$, the tentative solution is $x_r^*$, the VRAD constraint selection metric based on criteria from the first group and the second group comprises $$\left\{ \frac{a_i^T c}{b_i} \frac{(a_i^T x_r^* - b_i)}{\|a_i\|} \,\middle|\, a_i^T x_r^* > b_i \right\}$$

or its mathematical equivalent, and the ranking of the constraints is from a maximum value to a minimum value.

The method can also be illustrated using Algorithm 1 with the following changes: Denote $$VRAD(a_i, b_i, c, x) = \left\{ \frac{a_i^T c}{b_i} \frac{(a_i^T x - b_i)}{\|a_i\|} \,\bigg|\, a_i^T x > b_i \right\}.$$

Equivalently, $$VRAD(a_i, b_i, c, x) = \left\{ \cos(a_i, c) \frac{(a_i^T x_r - b_i)}{b_i} \,\bigg|\, a_i^T x_r > b_i \right\},$$

where Factor I is invoked in $\cos(a_i, c)$ and Factor II in $$\frac{(a_i^T x_r - b_i)}{b_i}.$$

The criterion of Algorithm 1

$$i^* \in \arg\max_{i \notin OPERATIVE} RAD(a_i, b_i, c, x_r^*),$$

is replaced by $$i^* \in \arg\max_{i \notin OPERATIVE} VRAD(a_i, b_i, c, x_r^*).$$

Since the VRAD criterion requires finding a constraint that maximizes a function of $x_r^*$, VRAD must evaluate each inoperative constraint on every iteration and thus requires computations unnecessary in RAD.

In COSTs for NLs, a bounding constraint is used to ensure that each relaxed problem $NL_r$ is bounded. However, the following methods consider not just NLs but general Ls, which may be unbounded or infeasible. When a linear programming problem is unbounded, there exists a feasible direction $d^*$ in the cone defined by $\{d | Ad \leq 0, d \geq 0\}$ such that $c^T d^* > 0$. For an unbounded relaxed problem $L_r$, let $d_r^*$ be a direction proving $L_r$ is unbounded. A constraint is added that eliminates this direction in the next iteration; that is, a COST searches for an inoperative constraint $i^*$ such that $a_j^T d_r^* > 0$. Algorithm 2 depicts the general COST that can be applied to any L.

To find an inoperative constraint such that $a_i^T d_r^* > 0$, a COST may use criteria similar to those of RAD or VRAD that are applied to an optimal solution.

---

Algorithm 2 General COST

---

STOP ← False.
OPERATIVE ← ∅. r ← 0.
while STOP = False do
    Using the dual simplex method, solve the problem$_{(6)-(8)}$
    if Problem $_{(6)-(8)}$ has an optimal solution $x_r^*$ then
        if $a_i^T x_r^* \leq b_i$, $\forall i \notin$ OPERATIVE, then
            STOP ← True. The point $x_r^*$ is an optimal solution.
        else
            Let $i^* \notin$ OPERATIVE such that $a_{i^*}^T x_r^* > b_{i^*}$ that
            maximizes some
            COST criteria.
            OPERATIVE ← OPERATIVE ∪ $\{i^*\}$. r ← r + 1.
        end if
    else

---

Algorithm 2 General COST

--- if Problem $^{(6)-(8)}$ has a direction $d_r^*$ proving it is
    unbounded then
        if $a_i^T d_r^* \leq 0$, $\forall i \notin$ OPERATIVE, then
            STOP ← True. The LP is unbounded with direction
            $d_r^*$.
        else
            Let $i^* \notin$ OPERATIVE such that $a_{i^*}^T d_r^* > 0$ that
            maximizes some
            COST criteria.
            OPERATIVE ← OPERATIVE ∪ $\{i^*\}$. r ← r + 1.
        end if
    else
        The LP is infeasible.
    end if
    end if
end while

---

Alternate versions of RAD in Algorithm 1 and VRAD similar to Algorithm 1 ignore the bounding constraint and use the criteria (9) and (10), respectively, on iterations in which the relaxed problem $N_r$ is unbounded.

$$i^* \in \arg\max_{i \notin OPERATIVE} \left\{ \frac{a_i^T c}{b_i} \,\bigg|\, a_i^T d_r^* > 0 \right\} \quad (9)$$

$$i^* \in \arg\max_{i \notin OPERATIVE} \left\{ \frac{a_i^T c}{b_i} \frac{a_i^T d_r^*}{\|a_i\|} \,\bigg|\, a_i^T d_r^* > 0 \right\}. \quad (10)$$

Figure 13:
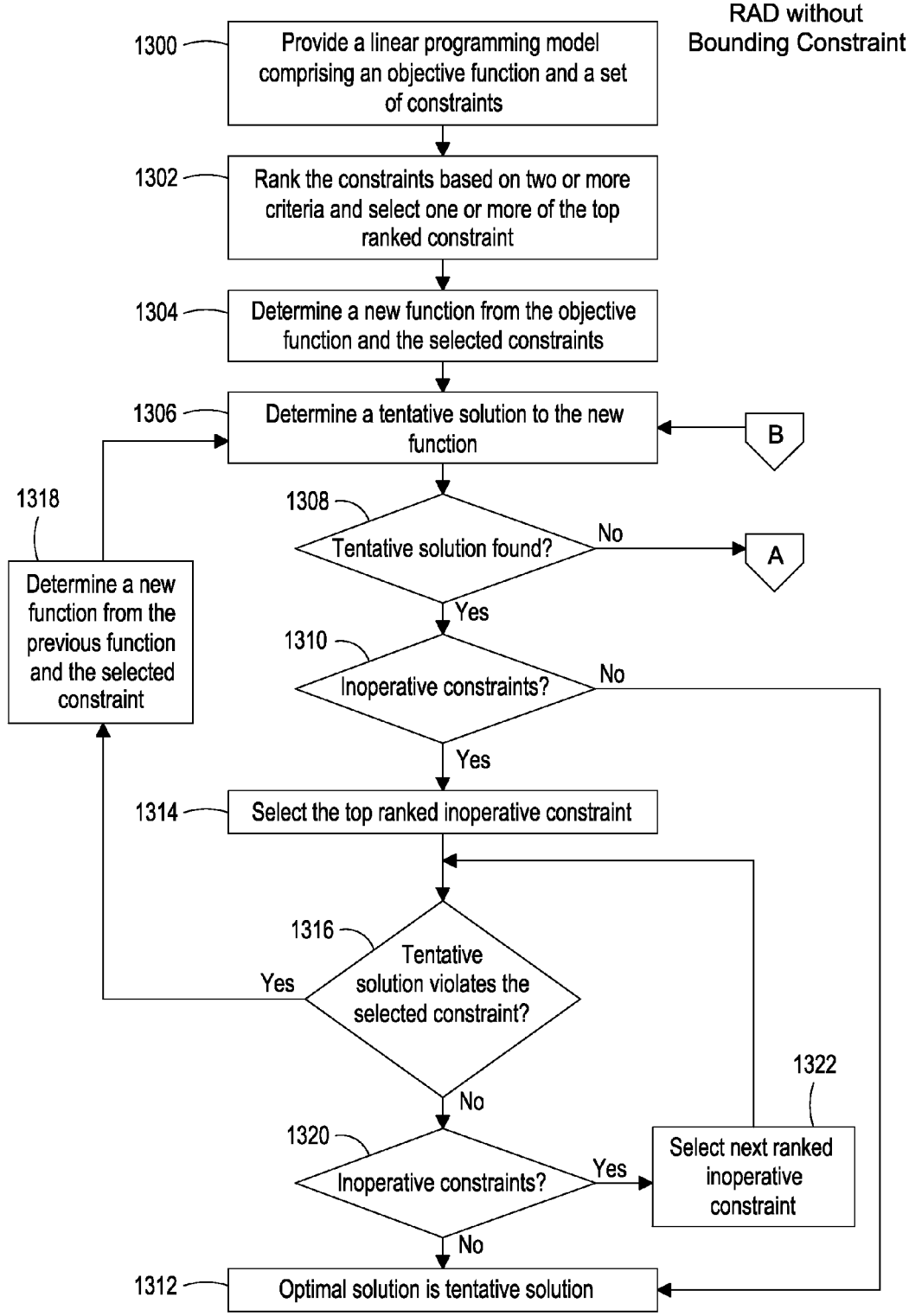
FIG. 13 is a flow chart of the Prior COST RAD without a bounding constraint in accordance with one embodiment of the present invention.

Now referring to FIG. 13, a flow chart of the Prior COST RAD without bounding constraints in accordance with one embodiment of the present invention is shown. A linear programming model comprising an objective function and a set of constraints that describe feasible allocations of the resources are provided in block 1300. The constraints are ranked according to a constraint selection metric based on at least one criterion selected from a first group and at least one criterion selected from a second group, and one or more of the top-ranked constraints are selected in block 1302. As used herein, an inoperative constraint is a model constraint that has not been previously selected. The first group (Factor I) includes the angle formed either by the gradient of a constraint not in the previous problem or by a vector obtained from some suitable mathematical combination of the gradients for multiple constraints not in the current problem with the gradient of the objective function at some relevant point, which may be the optimum to the previous problem. The second group (Factor II) includes the reduction of the feasible region of the previous problem by adding one or more relevant constraints to eliminate the solution to the previous problem but not the solution to the original problem.

A new problem is determined from the objective function and the selected constraints in block 1304, and a tentative resource allocation is determined based on the new function in block 1306. The tentative resource allocation can be determined using a primal simplex method, a dual simplex method or other applicable method. If a tentative solution is found in decision block 1308, and there are no inoperative constraints, as determined in decision block 1310, the optimal solution is the tentative solution and the resources are allocated in accordance with the optimal solution in block 1312. If, however, there are inoperative constraints, as determined in decision block 1310, the top ranked inoperative constraint is selected in block 1314. If the tentative solution violates the selected constraint, as determined in decision block 1316, a new function is determined from the previous function and the selected constraint in block 1318. The process loops back to determine a tentative solution to the new function in block 1306 and continues as previously described. If, however, the tentative solution does not violate the selected constraint, as determined in decision block 1316, and there are no inoperative constraints, as determined in decision block 1320, the optimal solution is the tentative solution and the resources are allocated in accordance with the optimal solution in block 1312. If, however, there are inoperative constraints, as determined in decision block 1320, the next ranked inoperative constraint is selected in block 1322 and the process loops back to determine whether or not the tentative solution violates the selected constraint, as determined in decision block 1316, and continues as previously described.

Figure 14:
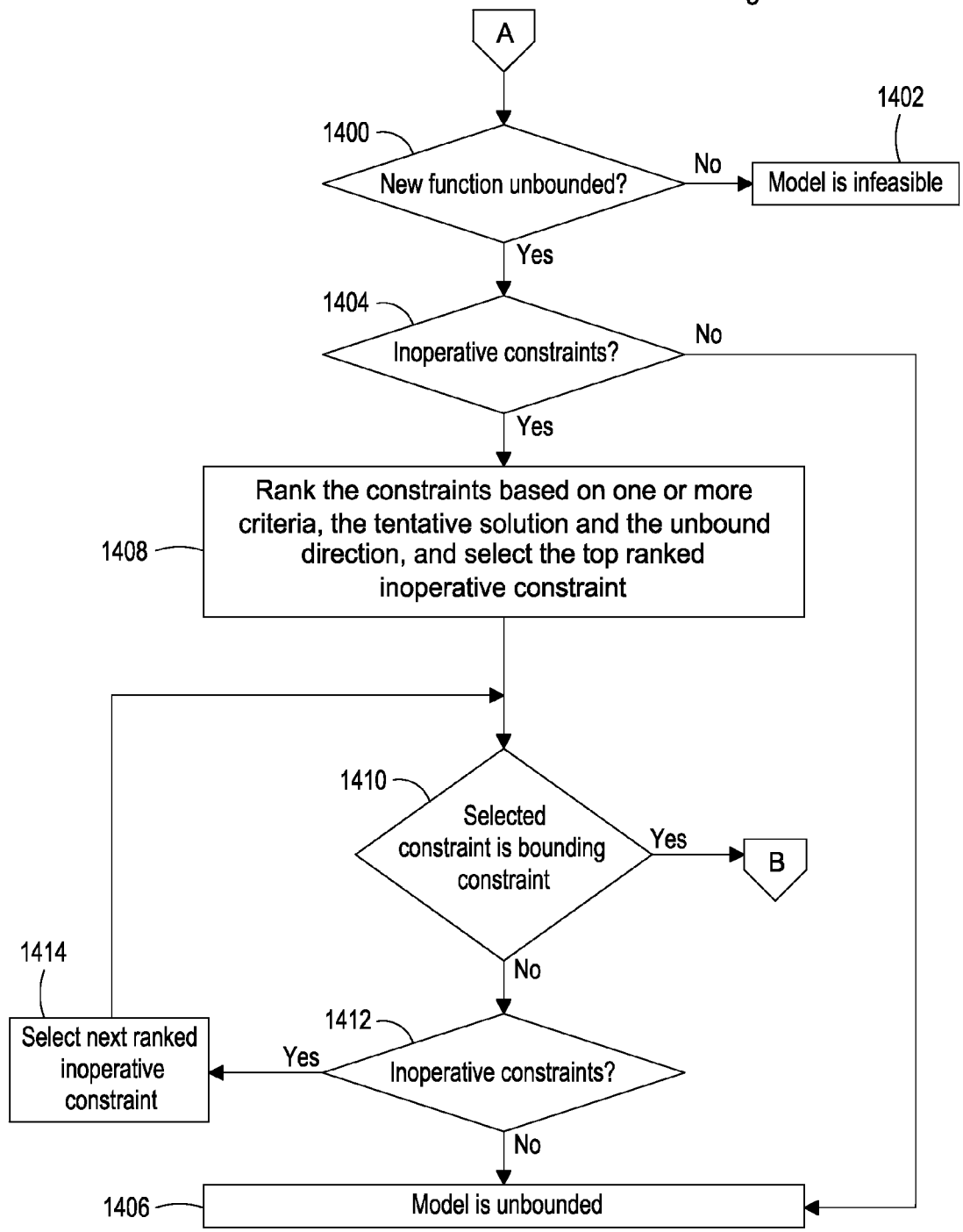
FIG. 14 is a flow chart associated with both FIGS. 13 and 15 in accordance with one embodiment of the present invention.

Now also referring to FIG. 14, if a tentative solution is not found, as determined in decision block 1308, and the objective function of the new problem is not unbounded, as determined in decision block 1400, the model is determined to be infeasible in block 1402. If, however, there are no inoperative constraints, as determined in decision block 1404, the objective function of the model is determined to be unbounded in block 1406. If, however, there are inoperative constraints, as determined in decision block 1404, the constraints are ranked according to a constraint selection metric, the tentative solution and the unbounded direction, and the top-ranked inoperative constraint is selected in block 1408. If the selected constraint makes the model's objective function finite, as determined in decision block 1410, the process loops back to determine a tentative solution to the new problem in block 1306 and continues as previously described. If, however, the selected constraint does not make the model's objective function finite, as determined in decision block 1410, and there are no inoperative constraints, as determined in decision block 1412, the model's objective function is determined to be unbounded in block 1406. If, however, there are inoperative constraints, as determined in decision block 1412, the next-ranked inoperative constraint is selected in block 1414 and the process loops back to determined whether or not the selected constraint makes the model's objective function finite in decision block 1410 and the process continues as previously described. Note that the method can be implemented using a computer program embodied on a computer readable medium wherein the steps are performed by one or more code segments.

In the Prior COST RAD, the objective function can be $z=c^T x$, the one or more constraints can be $a_i^T x \leq b_i$, the tentative solution is $x_r^*$, the RAD constraint selection metric determined by criteria from the first group and the second group comprises $$\left\{ \frac{a_i^T c}{b_i} \;\middle|\; a_i^T x_r^* > b_i \right\}$$

or its mathematical equivalent, and the ranking of the constraints is from a maximum value to a minimum value.

Figure 15:
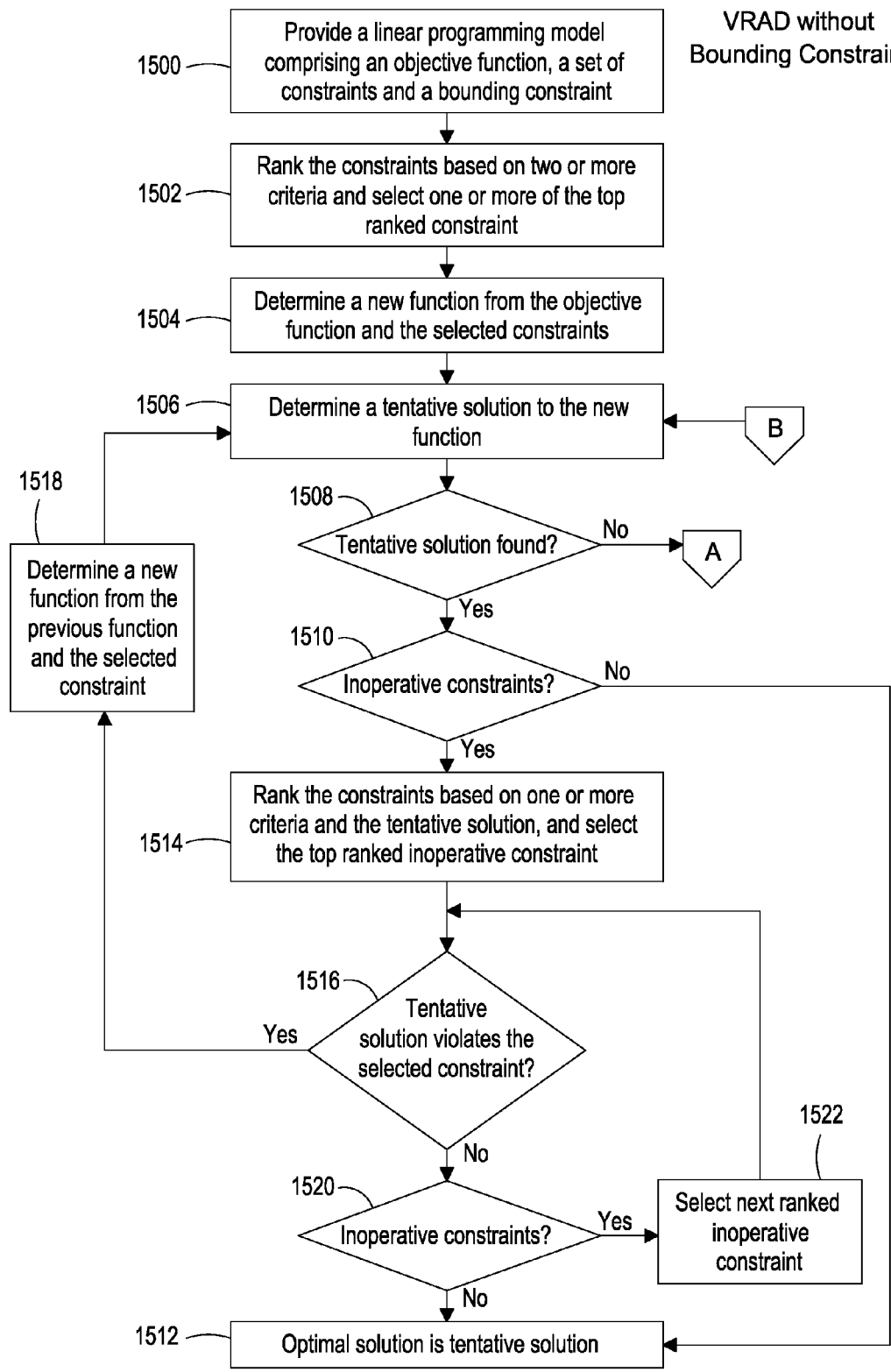
FIG. 15 is a flow chart of the Posterior COST VRAD without bounding constraints in accordance with one embodiment of the present invention.

Now referring to FIG. 15, a flow chart of the Posterior COST VRAD without bounding constraints in accordance with one embodiment of the present invention is shown. A linear programming model comprising an objective function and a set of constraints that describe feasible allocations of the resources are provided in block 1500. The constraints are ranked according to a constraint selection metric based on at least one criterion selected from a first group and, at least one criterion selected from a second group, and the tentative solution, and one or more of the top ranked constraints are selected in block 1502. As used herein, an inoperative constraint is a model constraint that has not been previously selected. The first group (Factor I) includes the angle formed either by the gradient of a constraint not in the previous problem or by a vector obtained from some suitable mathematical combination of the gradients for multiple constraints not in the current problem with the gradient of the objective function at some relevant point, which may be the optimum to the previous problem. The second group (Factor II) includes the reduction of the feasible region of the previous problem by adding one or more relevant constraints to eliminate the solution to the previous problem but not the original problem.

A new problem is determined from the objective function and the selected constraints in block 1504 and a tentative resource allocation is determined based on the new problem in block 1506. The tentative resource allocation can be determined using a primal simplex method, a dual simplex method or other applicable method. If a tentative solution is found in decision block 1508, and there are no inoperative constraints, as determined in decision block 1510, the optimal solution is the tentative solution and the resources are allocated in accordance with the optimal solution in block 1512. If, however, there are inoperative constraints, as determined in decision block 1510, the constraints are ranked based on the VRAD constraint selection metric and the tentative solution, and the top-ranked inoperative constraint is selected in block 1514. If the tentative solution violates the selected constraint, as determined in decision block 1516, a new problem is determined from the previous problem and the selected constraint in block 1518. The process loops back to determine a tentative solution to the new problem in block 1506 and continues as previously described. If, however, the tentative solution does not violate the selected constraint, as determined in decision block 1516, and there are no inoperative constraints, as determined in decision block 1520, the optimal solution is the tentative solution and the resources are allocated in accordance with the optimal solution in block 1512. If, however, there are inoperative constraints, as determined in decision block 1520, the next-ranked inoperative constraint is selected in block 1522 and the process loops back to determine whether or not the tentative solution violates the selected constraint, as determined in decision block 1516, and continues as previously described.

Now also referring to FIG. 14, if a tentative solution is not found, as determined in decision block 1508, and the new problem has no feasible allocations, as determined in decision block 1400, the model is determined to be infeasible in block 1402. If, however, there are no inoperative constraints, as determined in decision block 1404, the model's objective function is determined to be unbounded in block 1406. If, however, there are inoperative constraints, as determined in decision block 1404, the constraints are ranked based on the VRAD constraint selection metric, the tentative solution and the unbounded direction, and the top-ranked inoperative constraint is selected in block 1408. If the selected constraint causes the problem's objective problem not to be infinite, as determined in decision block 1410, the process loops back to determine a tentative solution to the new problem in block 1506 and continues as previously described. If, however, the selected constraint does not cause the problem's objective not to be infinite, as determined in decision block 1410, and there are no inoperative constraints, as determined in decision block 1412, the model is determined to have an unbounded objective function value in block 1406. If, however, there are inoperative constraints, as determined in decision block 1412, the next-ranked inoperative constraint is selected in block 1414 and the process loops back to determined whether or not the selected constraint causes the problem's objective function not to be infinite in decision block 1410 and the process continues as previously described. Note that the method can be implemented using a computer program embodied on a computer readable medium wherein the steps are performed by one or more code segments.

For the Posterior COST VRAD, the objective function can be $z=c^Tx$, the one or more constraints can be $a_i^Tx \leq b_i$, the tentative solution is $x_r^*$, the VRAD constraint selection metric comprises $$\left\{ \frac{a_i^T c}{b_i} \frac{a_i^T d_r^*}{\|a_i\|} \;\middle|\; a_i^T d_r^* > 0 \right\}$$

or its mathematical equivalent, and the ranking of the constraints is from a maximum value to a minimum value.

In addition, the present invention provides an apparatus for allocating resources using a linear programming model comprising an objective function and a set of constraints that describe feasible allocations of the resources. The apparatus includes a memory, an input/output interface and a processor communicably coupled to the memory and the input/output interface. The input/output interface (a) receives data regarding the objective function, the set of constraints and the resources, and (b) transmits data or instructions to allocate the resources. The processor (a) ranks according to a constraint selection metric based on at least one criterion selected from a first group and at least one criterion selected from a second group, (b) selects one or more of the top ranked constraints, (c) determines a new problem from the objective function and the selected constraints, (d) determines a tentative resource allocation based on the new problem, (e) whenever the tentative resource allocation violates at least one of the ranked constraints, selects one or more of the top-ranked violated constraints, and repeats the new problem determination and tentative resource allocation determination, and (f) provides data or instructions to the input/output interface to allocate the resources in accordance with the tentative resource allocation whenever the tentative resource allocation does not violate any of the inoperative constraints.

The present invention also provides a system for allocating resources using a linear programming model comprising an objective function and a set of constraints that describe feasible allocations of the resources. The system includes two or more resources, a controller, and one or more devices to allocate the resources in accordance with data or instructions received from the controller. The controller includes a memory, an input/output interface and a processor communicably coupled to the memory and the input/output interface. The input/output interface (a) receives data regarding the objective function, the set of constraints and the resources, and (b) transmits data or instructions to allocate the resources. The processor (a) ranks according to a constraint selection metric based on at least one criterion selected from a first group and at least one criterion selected from a second group, (b) selects one or more of the top ranked constraints, (c) determines a new problem from the objective function and the selected constraints, (d) determines a tentative resource allocation based on the new problem, (e) whenever the tentative resource allocation violates at least one of the ranked constraints, selects one or more of the top-ranked violated constraints, and repeats the new problem determination and tentative resource allocation determination, and (f) provides data or instructions to the input/output interface to allocate the resources in accordance with the tentative resource allocation whenever the tentative resource allocation does not violate any of the inoperative constraints.

Note that the following possible constraint selection metrics can also be used:

$$\left\{ \frac{b_i a_i^T c}{\|a_i\|^2} \;\middle|\; a_i^T x_r^* > b_i \right\}, \left\{ \frac{\|a_i\|}{b_i} \;\middle|\; a_i^T x_r^* > b_i \right\},$$

$$\left\{ \frac{a_i^T c}{\|a_i\|} \frac{(a_i^T x_r^* - b_i)}{\|a_i\|} \;\middle|\; a_i^T x_r^* > b_i \right\}, \left\{ \frac{(a_i^T x_r^* - b_i)}{\|a_i\|} \;\middle|\; a_i^T x_r^* > b_i \right\},$$

$$\left\{ \frac{(a_i^T x_r^* - b_i)}{b_i} \;\middle|\; a_i^T x_r^* > b_i \right\}, \left\{ \frac{b_i a_i^T c}{\|a_i\|^2} \;\middle|\; a_i^T d_r^* > b_i \right\},$$

$$\left\{ \frac{\|a_i\|}{b_i} \;\middle|\; a_i^T d_r^* > b_i \right\}, \left\{ \frac{a_i^T c}{\|a_i\|} \frac{d_r^*}{\|a_i\|} \;\middle|\; a_i^T x_r^* > b_i \right\},$$

$$\left\{ \frac{d_r^*}{\|a_i\|} \;\middle|\; a_i^T x_r^* > b_i \right\}, \left\{ \frac{d_r^*}{b_i} \;\middle|\; a_i^T x_r^* > b_i \right\},$$

or their mathematical equivalents. Moreover, the inequality constraints $a_i^T x \leq b_i$ can be changed or reversed, and one or more of the individual variable constraints $-x \leq 0$ can be removed or reversed. Furthermore, the possible constraint selection metrics can be determined by any mathematical combination of one or more of the following points, or their mathematical equivalents:

the $a_i$-points $\frac{b_i a_i}{\|a_i\|^2}$, $i = 1, \ldots, m$;

the $c$-points $\frac{b_i c}{a_i^T c}$, $j = 1, \ldots, m$;

the $a^j$-points $\frac{c_j a^j}{\|a^j\|^2}$, $j = 1, \ldots n$; or the $b$-points $\frac{c_j b}{(a^j)^T b}$, $j = 1, \ldots, n$.

The possible constraint selection metrics can also be further determined by a direction $d_r^*$ of appropriate dimension for either the tentative primal or dual objective function value. The constraint selection metrics can be used for both the primal and dual problems of the linear programming model under consideration to add both constraints and variables to the original linear programming model either simultaneously or sequentially. In addition, the constraint selection metrics can be used for the primal problem of the linear programming model under consideration to add constraints in conjunction with the constraint selection metric for the dual problem being used for the dual problem as a rule for a nonbasic primal variable to enter the primal basis in an iteration of some simplex method since selecting an inoperative constraint j to enter the dual problem can be considered as also selecting the corresponding $j^{th}$ primal variable to enter the primal basis.

The COST embodiments were applied to nonnegative linear programming problems and tested. RAD and VRAD were tested on a set of seven sparse large-scale nonnegative linear programming problems with up to a million constraints and thousands of variables. These problems were designed to be ill-suited for the primal and dual simplex algorithms but well-suited for the interior-point methods. Since RAD and VRAD utilize the dual simplex after adding constraints, the problems represent a worst-case scenario. But a dual simplex approach for solving linear programming problems is the primary approach for solving integer-programming, which is the dominant use of linear programming. The problems may be found at Reference 25 on the webpage for the Center on Stochastic Modeling Optimization & Simulation (COSMOS) of the University of Texas at Arlington.

The results from the solution by RAD and VRAD were compared to the state-of-art commercial CPLEX primal simplex, dual simplex, and polynomial interior-point barrier algorithms for linear programming. The computational results for these problems gave an average CPU time for RAD of roughly half a minute, 38 times faster than the best CPLEX simplex-based algorithm and virtually the same as the CPLEX barrier method, which cannot easily be used for integer programming. RAD outperformed the barrier method on five of seven problems.

VRAD added fewer constraints than RAD and hence solved the smaller problems. For the seven problems averaging over 600,000 constraints, VRAD added an average of only approximately 1500 constraints to arrive at a solution, effectively eliminating more than 99% of the constraints.

The seven large-scale NLs of Reference 37 were derived from Italian railway set-covering problems in OR-library, which were contributed by Paolo Nobili (Reference 38). After formulating their linear programming relaxed (i.e., without the integer restrictions) dual problems, these duals were modified as follows. The objective coefficients in the original primal problems are either one's or two's. In the right-hand side of the dual problems, these one's or two's randomly generated numbers between 0 and 100 were added. These modified dual problems of Reference 37 are described in Table 1. The number of constraints of these problems range between 47,311 and 1,092,610, the densities between 0.0040 and 0.0128. These specific problems were chosen because (i) most practical problems modeled by NL have a density less than approximately 0.01 and (ii) the problems' size and sparseness make them ill-suited for simplex methods but well-suited for barrier methods. In other words, they penalize the simplex-based COSTs.

TABLE 1

Test Problems

| Problems | Number of constraints | Number of variables | Number of nonzero coefficients | Density | Number of constraints binding at optimality |
|---|---|---|---|---|---|
| RDrail507 | 63,009 | 507 | 409,349 | 0.0128 | 274 |
| RDrail516 | 47,311 | 516 | 314,896 | 0.0129 | 267 |
| RDrail582 | 55,515 | 582 | 401,708 | 0.0124 | 278 |
| RDrail2536 | 1,081,841 | 2,536 | 10,993,311 | 0.0040 | 1,066 |
| RDrail2586 | 920,683 | 2,586 | 8,008,776 | 0.0034 | 1,307 |
| RDrail4284 | 1,092,610 | 4,284 | 11,279,748 | 0.0024 | 1,889 |
| RDrail4872 | 968,672 | 4,872 | 9,244,093 | 0.0020 | 2,100 |

Note that the application of RAD to the dual problem of the linear programming relaxation of the set-covering problem has an interesting economic interpretation. The linear programming relaxation of the set-covering problem is given by $$\min z = c^T x$$

$$\text{s.t. } Ax \geq 1$$

$$x \geq 0,$$

where 1 is an n×1 vector of ones, A is now a matrix of zeros and ones, and c>0. Each variable j represents a subset with cost $c_j$, and each constraint represents an item. When a subset j includes item i, the entry $a_{ij}$ is one; otherwise it is zero. The objective of the set-covering problem is to find a minimum cost set of subsets that cover each item at least once. The dual problem is given by $$\max z = 1^T x$$

$$\text{s.t. } A^T x \geq c$$

$$x \geq 0.$$

Now consider the RAD constraint selection metric $$\frac{a_j^T 1}{c_j}$$

of a constraint j, representing subset j, in the dual problem. The value $a_j^T 1$ is the number of items included in the subset j, while $c_j$ is its cost. Consequently, by maximizing the RAD criterion, the cost per unit item of the subsets is minimized.

Algorithm comparisons for the problems of Reference 37 were performed on a Dual 2.8-GHz Intel Xeon Workstation with a Linux operating system. The Presolve function in CPLEX was turned off in testing. Computational test results are summarized in Tables 2 through 7. Table 2 displays computational results for the standard ILOG CPLEX LP algorithms. The table includes the CPU time in seconds for all three algorithms, and the number of simplex iterations for both simplex methods. The results support the previous observation that the test problems would be ill-conditioned for simplex methods but well-conditioned for barrier methods.

TABLE 2

Computational results for the primal simplex, dual simplex, and barrier method.

| | Primal Simplex | | Dual Simplex | | Barrier Method |
|---|---|---|---|---|---|
| Problems | CPU time | Number of iterations | CPU time | Number of iterations | CPU time |
| RDrail507 | 8.08 | 1,339 | 7.46 | 1,347 | 0.95 |
| RDrail516 | 2.38 | 677 | 11.09 | 1,479 | 0.60 |
| RDrail582 | 0.71 | 420 | 3.47 | 1,180 | 0.80 |
| RDrail2536 | 2,188.00 | 12,368 | 1,612.81 | 7,778 | 48.58 |
| RDrail2586 | 2,375.00 | 16,178 | 1,255.00 | 8,340 | 28.39 |
| RDrail4284 | 3,545.00 | 21,438 | 8,503.00 | 29,231 | 123.99 |
| RDrail4872 | 2,278.00 | 18,951 | 1,468.31 | 12,065 | 52.37 |
| Average | 1,485.33 | 10,195 | 1,837.31 | 8,774 | 36.51 |

As previously discussed, Prior COSTs can sort the set of constraints to avoid unnecessary computations. In the implementations of RAD and COS, arrays of pointers were sorted to the constraint sets using qsort in ANSI C. Table 3 displays the CPU time required to sort the constraint sets of each problem. Because the blocks of memory for the original constraints are not in the same order as the sorted sets of pointers, searching for new constraints in Prior COSTs can cause extra steps accessing memory. Consequently, the implementations reallocate a new block of memory for the constraint set and copy the content of the original block in the order of the sorted points. Table 3 also shows the CPU time needed to reallocate the memory and copy the constraint set for each test problem. For the large problems, the total time needed to sort the pointers, reallocate memory, and copy the constraint set averaged 0.74 seconds. In other experiments, not reallocating memory and copying the constraints typically doubled the amount of RAD algorithm to solve the problems.

TABLE 3

The CPU time required to sort, reallocate memory, and copy the constraint sets.

| Problem | RAD sorting CPU time | COS sorting CPU time | Reallocation & copy CPU time |
|---|---|---|---|
| RDrail507 | 0.05 | 0.04 | 0.05 |
| RDrail516 | 0.03 | 0.03 | 0.03 |
| RDrail582 | 0.04 | 0.03 | 0.04 |
| RDrail2536 | 1.31 | 0.85 | 0.85 |
| RDrail2586 | 1.18 | 0.69 | 0.72 |
| RDrail4284 | 1.38 | 0.90 | 0.90 |
| RDrail4872 | 1.17 | 0.76 | 0.77 |
| Average | 0.74 | 0.47 | 0.48 |

Table 4 displays the computational results for the Prior COSTs using a bounding constraint of the form $1^T x \leq M$, which is parallel to the objective function of the test problems. The column "number or iterations" refers to the total number of original constraints of NL added to the terminal relaxed problem $NL_r$. The column "iterations $y_1$ is nonzero" gives the number of iterations in which the bounding constraint was redundant. The column "number of constraints evaluated" is the number of times the algorithm checked whether an inoperative constraint was feasible.

The results of Table 4 show that the RAD criterion is superior to both the pre-COSTs COS and SUB, where COS uses the constraint selection metric $\cos(a_i, c)$ and the constraint selection criterion of SUB simply chooses constraints in increasing order of their subscripts. RAD required about one-tenth the CPU time, less than half of the number of iterations, and only 5% of the inoperative constraints to be evaluated. RAD also substantially outperformed both the primal simplex and the dual simplex methods. Finally, RAD was faster than the CPLEX barrier method in five of the seven test problems, despite their sparsity favoring the barrier approach. On the other hand, the average time of the barrier method was slightly lower that than the RAD average. But unlike the barrier method, RAD maintains all of the attractive features of the dual simplex method, such as a basis, shadow prices, reduced costs, and sensitivity analysis as discussed in Reference 4 and Reference 5.

Since COSTs may be described as meta-algorithms, the polynomial barrier method could be used to solve $NL_r$. These modified versions of RAD and VRAD would clearly be polynomial. The difficulty is that barrier methods are not efficient at adding constraints to $NL_r$. In additional experiments, the dual simplex was replaced by the CPLEX barrier method in RDrail 2536, for example, which is well-suited for the latter approach. With this change the bounding constraint version of RAD took 5479.94 seconds of CPU time to obtain an optimal solution. This time was 2.5 times that for the CPLEX primal simplex and 3.4 times longer that for the dual simplex. Indeed, this polynomial version of RAD took 169.3 times longer than for RAD using the dual-simplex to solve RDrail 2536.

TABLE 4

Results of Prior COSTs using a bounding constraint.

| Algorithm | Problem | CPU time | Number of iterations | Iterations $y_1$ is nonzero | Number of constraints evaluated |
|---|---|---|---|---|---|
| RAD | RDrail507 | 0.62 | 543 | 321 | 1,141,150 |
| | RDrail516 | 0.46 | 452 | 343 | 1,767,358 |
| | RDrail582 | 0.57 | 557 | 426 | 1,680,664 |
| | RDrail2536 | 32.37 | 2,980 | 1,709 | 37,832,039 |
| | RDrail2586 | 51.67 | 3,207 | 1,882 | 162,523,377 |
| | RDrail4284 | 85.72 | 4,286 | 2,669 | 92,205,272 |
| | RDrail4872 | 96.52 | 4,506 | 2,969 | 289,919,008 |
| | Average | 38.28 | 2,361 | 1,474 | 83,866,981 |
| COS | RDrail507 | 5.77 | 1,182 | 673 | 30,371,781 |
| | RDrail516 | 3.19 | 968 | 754 | 17,932,186 |
| | RDrail582 | 5.94 | 1,270 | 983 | 31,327,337 |
| | RDrail2536 | 427.67 | 5,892 | 3,651 | 2,025,558,794 |
| | RDrail2586 | 609.71 | 6,339 | 3,706 | 3,390,724,128 |
| | RDrail4284 | 789.69 | 8,536 | 5,457 | 3,262,816,989 |
| | RDrail4872 | 1,018.19 | 9,098 | 6,046 | 5,089,328,683 |
| | Average | 408.59 | 4,755 | 3,038 | 1,978,294,271 |
| SUB | RDrail507 | 5.40 | 1,194 | 680 | 25,851,699 |
| | RDrail516 | 3.37 | 1,780 | 828 | 18,051,032 |
| | RDrail582 | 4.18 | 1,269 | 928 | 20,827,367 |
| | RDrail2536 | 384.58 | 6,288 | 3,977 | 1,719,245,203 |
| | RDrail2586 | 645.94 | 6,232 | 3,539 | 2,750,730,142 |
| | RDrail4284 | 848.41 | 8,720 | 5,730 | 3,872,303,892 |
| | RDrail4872 | 990.24 | 9,500 | 6,130 | 4,779,780,271 |
| | Average | 411.73 | 4,997 | 3,116 | 1,883,827,086 |

Table 5 shows alternate results of the Prior COSTs using the feasible directions previously described, instead of a bounding constraint. The column "iterations $NL_r$ is unbounded" displays the number of iterations in which a direction was used to determine the new constraint added to $NL_{r+1}$. The results from using RAD were slightly worse using directions than using the bounding constraint. By contrast COS and SUB required 50% more CPU time and 50% more constraints to be added using directions instead of the bounding constraint. However, the number of constraints needed to bound the problems was less when using directions. In other experiments on Prior COSTs, the CPU time for the dual simplex computations was often substantially less than that for constraint evaluation. In addition, for unbounded problems CPLEX returns the directions $$d^*_{rj} = \begin{cases} 1 & \text{if the column } j \text{ in } A_r \text{ is a vector of zeros,} \\ 0 & \text{otherwise.} \end{cases}$$

This form suggests the following artifice to save CPU time for problems with the special structure of our RDrail set. Denote a variable whose associated column in $A_r$ is 0 as an unbounded variable; other variables are considered bounded. To bound the problem $NL_r$ using directions, Prior COSTs ignore the bounded variables and greedily add constraints to bound the remaining variables. Observe that an implementation need not use CPLEX to find a direction proving unboundedness.

By comparison, every column for bounding-constraint COSTs has one nonzero in $a_1^T$. In this case, denote the unbounded variables as those with zeros in every row $a_1^T, \ldots, a_r^T$. Unlike the directions approach, some bounded variables in $x_r^*$ are nonzero. Thus Prior COSTs with a bounding constraint simultaneously bound the original NNLP and try to solve the problem $NL_r$ on the bounded variables as well.

TABLE 5

Results of Prior COSTs using directions.

| Algorithm | Problem | CPU time | Number of iterations | Iterations $P_r$ is unbounded | Number of constraints evaluated |
|---|---|---|---|---|---|
| RAD | RDrail507 | 0.70 | 558 | 255 | 1,098,166 |
| | RDrail516 | 0.59 | 467 | 279 | 1,845,771 |
| | RDrail582 | 0.65 | 628 | 350 | 1,635,337 |
| | RDrail2536 | 35.07 | 3,153 | 1,176 | 34,283,124 |
| | RDrail2586 | 57.80 | 3,425 | 1,555 | 159,318,440 |
| | RDrail4284 | 96.31 | 4,578 | 2,013 | 90,580,717 |
| | RDrail4872 | 117.14 | 4,926 | 2,546 | 291,258,257 |
| | Average | 44.04 | 2,533 | 1,167 | 82,859,973 |
| COS | RDrail507 | 9.08 | 1,668 | 311 | 37,263,474 |
| | RDrail516 | 5.31 | 1,521 | 340 | 22,102,978 |
| | RDrail582 | 8.75 | 1,836 | 412 | 37,991,123 |
| | RDrail2536 | 609.54 | 9,014 | 1,609 | 2,430,159,374 |
| | RDrail2586 | 912.98 | 9,000 | 1,780 | 4,340,257,708 |
| | RDrail4284 | 1,194.63 | 12,517 | 2,560 | 3,922,148,571 |
| | RDrail4872 | 1,521.19 | 13,085 | 3,004 | 6,480,077,26 |
| | Average | 608.78 | 6,948 | 1,430 | 2,467,142,927 |
| SUB | RDrail507 | 9.00 | 1,875 | 384 | 32,621,631 |
| | RDrail516 | 5.15 | 1,594 | 363 | 21,888,733 |
| | RDrail582 | 6.49 | 1,872 | 434 | 25,299,459 |
| | RDrail25836 | 592.14 | 9,690 | 1,744 | 2,152,278,660 |
| | RDrail2586 | 852.48 | 9,363 | 1,900 | 3,646,179,593 |
| | RDrail4284 | 1,578.19 | 13,673 | 2,756 | 5,098,454,428 |
| | RDrail4872 | 1,602.12 | 14,184 | 3,427 | 6,383,562,413 |
| | Average | 672.22 | 7,464 | 1,572 | 2,480,040,702 |

Tables 6 and 7 give the results of Posterior COSTs VRAD and VIOL using the bounding constraint and directions, respectively, where the column "Iterations $y_1$ is zero" in Table 6 refers to the total number of iterations in which the bounding constraint was redundant. In all but one instance, VRAD outperformed the pre-COST VIOL. Using VIOL with a bounding constraint to solve problem RDrail582 added 0.7 percent more constraints than VIOL and took 3 percent more time. On the other hand, with the directions approach, VRAD added 36 percent fewer constraints and took 37 percent less time. This data may imply that the VRAD criterion is more efficient for general cutting plane methods, discussed in References 4, 5, 39, and 40, than using the most violated constraint.

Note also that for Posterior COSTs the CPU time per iteration is roughly the same for each of the test problems. This fact results from the violation for each inoperative constraint being calculated for each iteration. The CPU time required for Posterior COSTs to execute the dual simplex on $NL_r$ is insignificant compared to the time needed to calculate these violations.

Finally, the computational results of Tables 6 and 7 reveal that VRAD is the only COST whose performance improved with directions instead of a bounding constraint. Essentially VRAD chooses constraints so efficiently in iterations s+1, ..., t that bounding the problem in early iterations using directions improves the overall computational efficiency of VRAD.

TABLE 6

Results of Posterior COSTs using a bounding constraint.

| Algorithm | Problem | CPU time | Number of iterations | Iterations $y_1$ is nonzero | CPU time per iteration |
|---|---|---|---|---|---|
| VRAD | RDrail507 | 3.30 | 380 | 193 | 0.0087 |
| | RDrail516 | 2.31 | 345 | 228 | 0.0067 |
| | RDrail582 | 3.45 | 421 | 262 | 0.0082 |
| | RDrail2536 | 341.30 | 1,835 | 880 | 0.1860 |
| | RDrail2586 | 298.07 | 2,070 | 1,087 | 0.1440 |
| | RDrail4284 | 556.11 | 2,805 | 1,454 | 0.1983 |
| | RDrail4872 | 530.12 | 3,197 | 1,849 | 0.1658 |
| | Average | 247.81 | 1,579 | 850 | 0.1569 |
| VIOL | RDrail507 | 3.82 | 415 | 215 | 0.0092 |
| | RDrail516 | 2.33 | 353 | 240 | 0.0066 |
| | RDrail582 | 3.35 | 418 | 273 | 0.0080 |
| | RDrail2536 | 354.26 | 1,881 | 954 | 0.1883 |
| | RDrail2586 | 302.49 | 2,065 | 1,152 | 0.1465 |
| | RDrail4284 | 563.19 | 2,807 | 1,150 | 0.2006 |
| | RDrail4872 | 542.89 | 3,257 | 2,009 | 0.1667 |
| | Average | 253.19 | 1,599 | 856 | 0.1583 |

TABLE 7

Results of Posterior COSTs using directions.

| Algorithm | Problem | CPU time | Number of iterations | Iterations $P_r$ is unbounded | CPU time per iteration |
|---|---|---|---|---|---|
| VRAD | RDrail507 | 3.27 | 369 | 164 | 0.0089 |
| | RDrail516 | 2.15 | 325 | 198 | 0.0066 |
| | RDrail582 | 3.22 | 398 | 237 | 0.0081 |
| | RDrail2536 | 313.21 | 1,690 | 657 | 0.1853 |
| | RDrail2586 | 283.44 | 1,999 | 939 | 0.1418 |
| | RDrail4284 | 510.82 | 2,622 | 1,147 | 0.1948 |
| | RDrail4872 | 492.70 | 3,075 | 1,576 | 0.1602 |
| | Average | 229.83 | 1,496 | 702 | 0.1535 |
| VIOL | RDrail507 | 5.39 | 594 | 121 | 0.0091 |
| | RDrail516 | 3.56 | 530 | 162 | 0.0067 |
| | RDail582 | 5.08 | 624 | 154 | 0.0081 |
| | RDrail2536 | 470.17 | 2,560 | 499 | 0.1837 |
| | RDrail2586 | 416.15 | 2,908 | 642 | 0.1431 |
| | RDrail4284 | 742.46 | 3,840 | 806 | 0.1933 |
| | RDrail4872 | 742.76 | 4,542 | 1,120 | 0.1645 |
| | Average | 340.80 | 2,228 | 500 | 0.1529 |

The most important potential use of COSTs lies in the solution of integer programming problems. In practice an integer programming problem is usually a nonnegative linear programming with some or all of the variables restricted to be nonnegative integers. The general integer programming problem is the problem IP maximize: $z = c^T x$ subject to: $Ax \leq b;$ (11)

$x \geq 0;$ (12)

$x_j \epsilon Q, j \epsilon J \subseteq \{1, \ldots n\};$ (13)

where:
x is an n×1 vector of variables $x_j$, j=1, ..., n;
A is an m×n matrix $[a_{ij}]$ with 1×n transposed row vectors $a_i^T$,
i=1, ..., m;
b is an m×1 vector;
c is an n×1 vector;
0 is an n×1 vector of zeros;
Q is the set of nonnegative integers {0, 1, 2, ... }; and
J is the set of indices of the variables $x_j$ that are required to be integers.

Branch-and-bound and other cutting plane algorithms (References 39 and 40) represent the method of choice for solving problem IP. These algorithms add constraints that separate the solution to IP from a current relevant point, usually the optimal solution to a relaxed linear programming problem without the integer constraints of Equation (13) but with the constraints Equations (11) and (12) as well as possibly some previously added cutting planes. RAD and VRAD, for example, can be incorporated into such algorithms to solve the linear programming problems for which a simple-based approach is needed.

Perhaps the most important type of integer-programming problem is 0-1, or binary, integer programming problem BP maximize: $z = c^T x$ subject to: $Ax \leq b$;

$x \geq 0$;

$x_j \in \{0,1\}, j \in \{1, \ldots, n\}$. (14)

Equivalently, it may be written as maximize: $z = c^T x$ subject to: $Ax \leq b$;

$x \geq 0$; and $x_j \in Q, j \in \{1, \ldots, n\}$.

where:
1 is an n×1 vector of ones, since the only integers in [0,1] are precisely 0 and 1.

Binary integer programming problems provide the most frequently used model in industrial applications involving linear programming. For example, disruptions in airline transportation systems can prevent airlines from executing their schedules as planned. Rosenberger et al. (Reference 16) present an optimization model for aircraft recovery that reschedules flight legs and reroutes aircraft by minimizing an objective function involving both rerouting and cancellation costs.

The aircraft recovery problem is modeled as 0-1 integer programming problem in which each leg is either in a route or cancelled. Consider a set of aircraft $\Phi$, a set of disrupted aircraft $\Phi^* \subseteq \Phi$, and a time horizon $(t_0, T)$. For each $\phi \in \Phi$, let $F(\phi)$ be the initial route of aircraft $\phi$, and let $F = \cup_{\phi \in \Phi} F(\phi)$ be the set of all legs in any initial route, for each $f \in F$, let $b_f$ be the cost of canceling leg f, and let $y_f$ be 1 if leg 1 is cancelled, or be 0 otherwise. For each aircraft $\phi \in \Phi$, let $R(\phi, F)$ be the set of maintenance feasible routes of aircraft $\phi$ that can be constructed from legs in F. For each route $q \in R(\phi, F)$, let the $c_q$ be the cost of assigning route q to aircraft $\phi$, and let $x_q$ be 1 if route q is assigned to aircraft $\phi$ or 0 otherwise.

Let A be the set of allocated arrival slots. For each slot $a \in A$, the number of landings at a station is restricted within a time period to capacity $\alpha_a$, and let R(a) be the set of routes that include legs that land in arrival slot a. For each route $q \in R(\phi, F)$, let H(q,a) be the set of legs q that use slot a.

Then the aircraft recovery problem is the 0-1 integer programming problem with variables $x_q$ and $y_f$ $$\text{minimize:} \sum_{\phi \in \Phi} \sum_{q \in R(\phi,F)} c_q x_q + \sum_{f \in F} b_f y_f$$

$$\sum_{q \in R(\Phi,F)} x_q = 1, \forall \phi \in \Phi$$

$$\sum_{q \in R(\Phi,F)} x_q + y_f = 1, \forall f \in F$$

-continued $$\sum_{q \in R(a)} |H(q,a)| x_r \leq \alpha_a, \forall a \in A$$

$x_q \in \{0, 1\}, \forall q \in R(\phi, F), \phi \in \Phi$ $y_f \in \{0, 1\}, \forall f \in F$.

The major advantage of the present invention is the speed with the very large mathematical programming problems and linear programming problems, in particular, of industrial applications can be solved. This speed permits for the first time the practical possibility of solving integer and binary programming problems almost immediately, in "real time." The present invention also permits the possibility of solving such problems too large to be carried out in a reasonable time by the prior-art methods.

It will be understood by those of skill in the art that such COSTs embodiments as RAD and VRAD presented above for NL are readily modified to L. It will be also understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

REFERENCES

U.S. Pat. No. 4,744,026 issued to Vanderbei on May 10, 1988
U.S. Pat. No. 4,744,028 issued to Karmarkar on May 10, 1988
1. Nonlinear Programming: Theory and Algorithms, M. S. Bazaraa, H. D. Sherali, and C. M. Shetty, 2006.
2. Introduction to Mathematical Programming: Applications and Algorithms, W. Winston and M. Venkataramanan, 2002.
3. Model Building in Mathematical Programming, H. P. Williams, 1999.
4. Linear Programming and Network Flows, M. S. Bazaraa, J. J. Jarvis, and H. D. Sherali, 2005.

5. Linear Programming 1: Introduction, G. B. Dantzig and M. N. Thapa, 1997.
6. "Design and Optimization of Networks with Dynamic Routing," G. R. Ash, R. H. Cardwell, and R. P. Murray, The Bell System Tech. Journal 60 (1981) 1787-1820.
7. "Maximization of a linear function of variables subject to linear inequalities," G. B. Dantzig, in Activity Analysis of Production and Allocation, T. C. Koopmans (ed.), 1951, 339-347.
8. "A polynomial time algorithm for linear programming," L. G. Khachiyan, Soviet Mathematics Doklady 30 (1979) 191-94.
9. "Interactive solution of problems of linear and quadratic programming" (in Russian), I. I. Dikin, Doklady Akademiia Nauk SSSR, 174 (1967) 747-748. English Translation, Soviet Mathematics Doklady 8 (1967) 674-675.
10. "On the speed of an interactive process" (in Russian), I. I. Dikin, Upravlaemye Sistemy 12 (1974) 54-60.
11. "A new polynomial-time algorithm for linear programming," M. Karmarkar, Combinatorica 4 (1984) 373-379.
12. "Theory and practice for interior-point methods," M. J. Todd, M. J., ORSA Journal on Computing 6 (1994) 28-31.
13. "The many facets of linear programming," M. J. Todd, Mathematical Programming 91 (2002) 417-436.
14. "Solving real-world linear programs: a decade and more of progress," R. E. Bixby, Operations Research 50 (2002) 3-15.
15. Interior Point Methods for Linear Optimization, C. Roos, T. Terlaky, and J. Vial, 2006.
16. "Rerouting aircraft for airline recovery," J. M. Rosenberger, E. L. Johnson, and G. L. Nemhauser, Transportation Science 37 (2003) 408-421.
17. "GPS network design: logistics solution using optimal and near-optimal methods," P. Dare and H. Saleh, Journal of Geodesy 74 (2000) 467-478.
18. "A linear programming approach for identifying a consensus sequence on DNA sequences," H. L. Li and C. J. Fu, Bioinformatics 21 (2005) 1838-1845.
19. Large Scale Linear and Integer Optimization: A Unified Approach, R. K. Martin, 1999.
20. Linear Operator Theory in Engineering and Science, A. Naylor and G. Sell (1982) 273-274.
21. "The cosine simplex algorithm," H. W. Corley, J. M. Rosenberger, W. C. Yeh, and T. K. Sung, International Journal of Advanced Manufacturing Technology 27 (2006) 1047-1050.
22. "A numerically stable form of the simplex algorithm," P. E. Gill and W. Murray, Linear Algebra and Its Applications 7 (1973) 99-138.
23. "A non-simplex active-set method for linear programs in standard form," A. Santos-Palomo and P. Guerrero-Garcia, Studies in Informatics and Control 14 (2005) 79-84.
24. "An external reconstruction approach (ERA) to linear programming," M. Zeleny, Computers and Operations Research 13 (1986) 95-100.
26. "A primal-dual simplex method for linear programs," N. Curet, Operations Research Letters 13 (1993) 233-237.
28. "Practical finite pivoting rules for the simplex method," P.-Q. Pan, OR Spektrum 12 (1990) 219-225.
28. "A simplex-like method of with bisection for linear programming," P.-Q. Pan, Optimization 22 (1991) 717-743.
29. "A variant of the dual pivoting rule in linear programming," P.-Q. Pan, Journal of Information and Optimization Sciences 15 (1994) 405-413.
30. "The most-obtuse-angle-row pivot rule for achieving dual feasibility: a computational study," P.-Q. Pan, European Journal of Operational Research 101 (1997) 167-176.
31. "A basis-deficiency-allowing variation of the simplex method of linear programming," P.-Q. Pan, Computers and Mathematics with Applications 36 (1998) 33-53.
32. "A phase-I algorithm using the most-obtuse-angle rule for the basis-deficiency dual simplex method," P.-Q. Pan, W. Li, and Y. Wang, OR Transactions 8 (2004) 88-96.
33. "Two direct methods in linear programming," N. V. Stojkovic and P. S. Stanimirovic, European Journal of Operational Research 131 (2001) 417-439.
34. "Steepest-edge simplex algorithms for linear programming," J. J. Forrest and D. Goldfarb, Mathematical Programming 57 (1992) 341-374.
35. "A simplex cosine method for solving the Klee-Minty cube," F. Trigos, J. Frausto-Solis, and R. R. Rivera-Lopez, Advances in Simulation, System Theory and Systems Engineering, WSEAS Press 70X (2002) 27-32.
36. An improved initial basis for the simplex algorithm," H. Vieira H and M. P. Estellita-Lins, Computers and Operations Research 32 (2005) 1983-1993.
37. COSMOS problem instances, http://ieweb.uta.edu/cosmos/Instances.htm.
38. OR-library, J. E. Beasley, http://people.brunel.ac.uk/~mastjjb/jeb/info.html.
39. Integer and Combinatorial Optimization, L. A. Wolsey and G. L. Nemhauser, 1999.
40. "Progress in linear programming-based algorithms for integer programming: an exposition," E. L. Johnson, G. L. Nemhauser, and M. W. Savelsbergh, INFORMS Journal of Computing 12 (2000) 2-23.

What is claimed is:

1. A method for allocating resources using a linear programming model comprising an objective function and a set of model constraints that describe feasible allocations of the resources, the method comprising the steps of:
   (a) ranking the model constraints according to a constraint selection metric based on at least one criterion selected from a first group and at least one criterion selected from a second group;
   (b) making an initial selection of one or more of the top ranked model constraints;
   (c) determining a new problem by adding the selected model constraints to the objective function or a previously determined new problem;
   (d) determining a tentative resource allocation based on the new problem if the tentative resource allocation exists;
   (e) if the tentative resource allocation cannot be determined, then terminating the method and reporting that the tentative resource allocation cannot be determined;
   (f) whenever any of the ranked model constraints have not been previously selected: (1) selecting one or more next ranked model constraints that have not been previously selected, (2) if the tentative resource allocation violates the selected next ranked model constraints, repeating step (c) using the selected next ranked model constraints instead of the selected model constraints and steps (d), (e) and (f), and (3) if the tentative resource allocation does not violate the selected next ranked model constraints, repeating step (f); and
   (g) whenever all the model constraints have been previously selected, allocating the resources in accordance with the tentative resource allocation.

2. The method for allocating resources as recited in claim 1, wherein the at least one model constraint further comprises one or more artificial constraints that are not in the set of model constraints to bound the feasible resource allocations without eliminating an optimum allocation of the resources based on the objective function.

3. The method for allocating resources as recited in claim 1, wherein after the tentative resource allocation is determined, then ranking the model constraints according to the constraint selection metric based on the at least one criterion selected from the first group and the at least one criterion selected from the second group, as well as the tentative resource allocation, before selecting the next ranked model constraints that have not been previously selected.

4. The method for allocating resources as recited in claim 1, wherein:
the linear programming model is augmented by one or more bounding constraints;
an inoperative constraint comprises any model constraint that has not been previously selected;
the first group comprises (i) an angle formed by a gradient of the inoperative constraint, (ii) a vector obtained from a combination of the gradients for multiple inoperative constraints with the gradient of the new problem at the tentative solution, (iii) an angle formed by a normal vector $a_i$ of the inoperative constraint, (iv) an angle formed by a vector obtained from a combination of the gradients for multiple inoperative constraints with the normal c of the new problem, or (v) a combination thereof;
the second group comprises the reduction of the feasible region of the previously determined problem by adding one or more relevant constraints to eliminate the tentative resource allocation to the previously determined problem but not the tentative resource allocation to the linear programming model.

5. The method for allocating resources as recited in claim 1, wherein:
one or more additional criterion are selected in addition to selecting the criterion from the first group and the second group; and
the additional criterion comprise (i) a total decrease in a value of the new problem, either independent or dependent on the tentative resource allocation, upon adding one or more inoperative constraints wherein an inoperative constraint comprises any model constraint that has not been previously selected, (ii) a rate of decrease in the value of the new problem, either independent or dependent on the tentative resource allocation, upon adding one or more inoperative constraints, (iii) the scaling of all relevant constraints in such a way that their influence on the constraint selection metric is commensurate but their possible reduction of the feasible region of the previously determined problem is not affected by this scaling, or (iv) a combination thereof.

6. The method for allocating resources as recited in claim 1, wherein:
the objective function to be minimized (or maximized) has a tentative primal objective function value $z_r = c^T x_r^*$;
the one or more model constraints comprise $a_i^T x \leq b_i$, or $a_i^T x \leq b_i$ and $-x \leq 0$;
the tentative resource allocation comprises a tentative primal allocation $x_r^*$;
the possible constraint selection metrics based on at least one criterion from the first group and at least one criterion from the second group comprise $$\left\{ \frac{a_i^T c}{b_i} \mid a_i^T x_r^* > b_i \right\}, \left\{ \frac{a_i^T c}{b_i} \frac{(a_i^T x_r^* - b_i)}{\|a_i\|} \mid a_i^T x_r^* > b_i \right\},$$

-continued $$\left\{ \frac{a_i^T c}{b_i} \mid a_i^T d_r^* > 0 \right\}, \left\{ \frac{a_i^T c}{b_i} \frac{a_i^T d_r^*}{\|a_i\|} \mid a_i^T d_r^* > 0 \right\},$$

or their mathematical equivalents; and
the ranking of the model constraints is from a maximum value to a minimum value.

7. The method for allocating resources as recited in claim 6, wherein the possible constraint selection metrics further comprise $$\left\{ \frac{b_i a_i^T c}{\|a_i\|^2} \mid a_i^T x_r^* > b_i \right\}, \left\{ \frac{\|a_i\|}{b_i} \mid a_i^T x_r^* > b_i \right\},$$

$$\left\{ \frac{a_i^T c}{\|a_i\|} \frac{(a_i^T x_r^* - b_i)}{\|a_i\|} \mid a_i^T x_r^* > b_i \right\}, \left\{ \frac{(a_i^T x_r^* - b_i)}{\|a_i\|} \mid a_i^T x_r^* > b_i \right\},$$

$$\left\{ \frac{(a_i^T x_r^* - b_i)}{b_i} \mid a_i^T x_r^* > b_i \right\}, \left\{ \frac{b_i a_i^T c}{\|a_i\|^2} \mid a_i^T d_r^* > b_i \right\},$$

$$\left\{ \frac{\|a_i\|}{b_i} \mid a_i^T d_r^* > b_i \right\}, \left\{ \frac{a_i^T c}{\|a_i\|} \frac{d_r^*}{\|a_i\|} \mid a_i^T x_r^* > b_i \right\},$$

$$\left\{ \frac{d_r^*}{\|a_i\|} \mid a_i^T x_r^* > b_i \right\}, \left\{ \frac{d_r^*}{b_i} \mid a_i^T x_r^* > b_i \right\},$$

or their mathematical equivalents.

8. The method for allocating resources as recited in claim 6, wherein one or more of the inequality constraints $a_i^T x \leq b_i$ are changed or reversed, and one or more of the individual variable constraints $-x \leq 0$ are removed or reversed.

9. The method for allocating resources as recited in claim 6, wherein the possible constraint selection metrics are determined by any mathematical combination of one or more of the following points, or their mathematical equivalents:

the $a_i$-points $\frac{b_i a_i}{\|a_i\|^2}$, $i = 1, \ldots, m$;

the c-points $\frac{b_i c}{a_i^T c}$, $j = 1, \ldots, m$;

the $a^j$-points $\frac{c_j a^j}{\|a^j\|^2}$, $j = 1, \ldots n$; or the b-points $\frac{c_j b}{(a^j)^T b}$, $j = 1, \ldots, n$.

10. The method for allocating resources as recited in claim 6, wherein the possible constraint selection metrics are further determined by a direction $d_r^*$, of appropriate dimension for either the tentative primal or dual objective function value.

11. The method for allocating resources as recited in claim 9 wherein:
the constraint selection metrics are used for both the primal and dual problems of the linear programming model under consideration to add both model constraints and variables to the linear programming model either simultaneously or sequentially; or
the constraint selection metrics are used for the primal problem of the linear programming model under consideration to add constraints in conjunction with the constraint selection metric for the dual problem being used for the dual problem as a rule for a nonbasic primal variable to enter the primal basis in an iteration of some simplex method since selecting an inoperative constraint j to enter the dual problem can be considered as also selecting the corresponding $j^{th}$ primal variable to enter the primal basis.

12. The method for allocating resources as recited in claim 1, wherein the tentative resource allocation is determined using a primal simplex method or a dual simplex method, or any method to solve a linear programming problem existing or yet to be developed.

13. The method for allocating resources as recited in claim 1, wherein the resource allocation by a linear programming model determines or approximates (a) optimal resource allocations, resource amounts, mixture selection, portfolio selection, commodity distribution, performance of a controlled process, paths, flows, networks, or assignment of an item to a class, (b) maximum profit, (c) minimum cost, (d) strategies and equilibria in game theory, (e) solutions to a system of linear equations or inequalities, nonlinear equations or inequalities, Diophantine linear equations, or linear equations in which the variables are integers, binary integers, unrestricted in sign or required to be nonnegative, or (f) the approximate solution of any nonlinear mathematical system of equations or inequalities that can be approximated by linearizing the nonlinear system with the possible addition of further linear equations and/or linear inequalities and/or continuous, integer, or 0-1 binary variables, such as a system of partial differential equations and/or inequalities.

14. The method for allocating resources as recited in claim 1, wherein the resources comprise communication resources, computer resources, electrical resources, transportation resources, military resources, healthcare resources, agricultural resources, natural resources, physical resources, human resources, technological resources, processing resources, industrial resources, or a combination thereof.

15. A computer program embodied on a non-transitory computer readable medium for allocating resources using a linear programming model comprising an objective function and a set of model constraints that describe feasible allocations of the resources, the computer program comprising:
(a) a code segment for ranking the model constraints based on at least one constraint selection criterion selected from a first group and at least one criterion selected from a second group;
(b) a code segment for making an initial selection of one or more of the top ranked model constraints;
(c) a code segment for determining a new problem by adding the selected model constraints to the objective function or a previously determined problem;
(d) a code segment for determining a tentative resource allocation based on the new problem if the tentative resource allocation exists;
(e) a code segment for terminating the method and reporting that the tentative resource allocation cannot be determined if the tentative resource allocation cannot be determined;
(f) a code segment for whenever any of the ranked model constraints have not been previously selected: (1) selecting one or more next ranked model constraints that have not been previously selected, (2) if the tentative resource allocation violates the selected next ranked model constraints, repeating code segment (c) using the selected next ranked model constraints instead of the selected model constraints and code segments (d), (e) and (f), and (3) if the tentative resource allocation does not violate the selected next ranked model constraints, repeating step (f); and
(g) a code segment for whenever all the model constraints have been previously selected, allocating the resources in accordance with the tentative resource allocation.

16. An apparatus for allocating resources using a linear programming model comprising an objective function and a set of model constraints that describes feasible allocations of the resources, the apparatus comprising:
a memory;
an input/output interface that (a) receives data regarding the objective function, the set of constraints and the resources, and (b) transmits data or instructions to allocate the resources; and
a processor communicably coupled to the memory and the input/output interface wherein the processor (a) ranks the model constraints on a constraint selection metric based on at least one criterion from a first group and at least one criterion from a second group, (b) makes an initial selection of one or more of the top ranked model constraints, (c) determines a new problem by adding the selected model constraints to the objective function or a previously determined new problem, (d) determines a tentative resource allocation based on the new problem if the tentative resource allocation exists; (e) if the tentative resource allocation cannot be determined, then terminating the method and reporting that the tentative resource allocation cannot be determined, (f) whenever any of the ranked model constraints have not been previously selected: (1) selecting one or more next ranked model constraints that have not been previously selected, (2) if the tentative resource allocation violates the selected next ranked model constraints, repeating step (c) using the selected next ranked model constraint instead of the selected model constraints and steps (d), (e) and (f), and (3) if the tentative resource allocation does not violate the selected next ranked model constraints, repeating step (f), and (g) whenever all the model constraints have been previously selected, provides data or instructions to the input/output interface to allocate the resources in accordance with the tentative resource allocation.

17. The apparatus for allocating resources as recited in claim 16, wherein after the tentative resource allocation is determined, then ranking the model constraints according to the constraint selection metric based on the at least one criterion selected from the first group and the at least one criterion selected from the second group, as well as the tentative resource allocation, before selecting the next ranked model constraint that has not been previously selected.

18. The apparatus for allocating resources as recited in claim 16, wherein:
the linear programming model is augmented by one or more bounding constraints;
an inoperative constraint comprises any model constraint that has not been previously selected;
the first group comprises (i) an angle formed by a gradient of the inoperative constraint, (ii) a vector obtained from a combination of the gradients for multiple inoperative constraints with the gradient of the new problem at the tentative solution, (iii) an angle formed by a normal vector $a_i$ of the inoperative constraint, (iv) an angle formed by a vector obtained from a combination of the gradients for multiple inoperative constraints with the normal c of the new problem, or (v) a combination thereof;
the second group comprises the reduction of the feasible region of the previously determined problem by adding one or more relevant constraints to eliminate the tentative resource allocation to the previously determined problem but not the tentative resource allocation to the linear programming model.

19. The apparatus for allocating resources as recited in claim 16, wherein:
the objective function to be minimized (or maximized) has a tentative primal objective function value $z_r = c^T x_r^*$;
the one or more model constraints comprise $a_i^T x \leq b_i$, or $a_t^T x \leq b_i$ and $-x \leq 0$;
the tentative resource allocation comprises a tentative primal allocation $x_r^*$;
the possible constraint selection metrics based on at least one criterion from the first group and at least one criterion from the second group comprise $$\left\{ \frac{a_i^T c}{b_i} \;\middle|\; a_i^T x_r^* > b_i \right\}, \left\{ \frac{a_i^T c}{b_i} \frac{(a_i^T x_r^* - b_i)}{\|a_i\|} \;\middle|\; a_i^T x_r^* > b_i \right\},$$

$$\left\{ \frac{a_i^T c}{b_i} \;\middle|\; a_i^T d_r^* > 0 \right\}, \left\{ \frac{a_i^T c}{b_i} \frac{a_i^T d_r^*}{\|a_i\|} \;\middle|\; a_i^T d_r^* > 0 \right\},$$

or their mathematical equivalents; and
the ranking of the model constraints is from a maximum value to a minimum value.

20. The apparatus for allocating resources as recited in claim 19, wherein the possible constraint selection metrics further comprise $$\left\{ \frac{b_i a_i^T c}{\|a_i\|^2} \;\middle|\; a_i^T x_r^* > b_i \right\}, \left\{ \frac{\|a_i\|}{b_i} \;\middle|\; a_i^T x_r^* > b_i \right\},$$

$$\left\{ \frac{a_i^T c}{\|a_i\|} \frac{(a_i^T x_r^* - b_i)}{\|a_i\|} \;\middle|\; a_i^T x_r^* > b_i \right\}, \left\{ \frac{(a_i^T x_r^* - b_i)}{\|a_i\|} \;\middle|\; a_i^T x_r^* > b_i \right\},$$

$$\left\{ \frac{(a_i^T x_r^* - b_i)}{b_i} \;\middle|\; a_i^T x_r^* > b_i \right\}, \left\{ \frac{b_i a_i^T c}{\|a_i\|^2} \;\middle|\; a_i^T d_r^* > b_i \right\},$$

$$\left\{ \frac{\|a_i\|}{b_i} \;\middle|\; a_i^T d_r^* > b_i \right\}, \left\{ \frac{a_i^T c}{\|a_i\|} \frac{d_r^*}{\|a_i\|} \;\middle|\; a_i^T x_r^* > b_i \right\},$$

$$\left\{ \frac{d_r^*}{\|a_i\|} \;\middle|\; a_i^T x_r^* > b_i \right\}, \left\{ \frac{d_r^*}{b_i} \;\middle|\; a_i^T x_r^* > b_i \right\},$$

or their mathematical equivalents.

21. The apparatus for allocating resources as recited in claim 19, wherein one or more of the inequality constraints $a_i^T x \leq b_i$ are changed or reversed, and one or more of the individual variable constraints $-x \leq 0$ are removed or reversed.

22. The apparatus for allocating resources as recited in claim 19, wherein the possible constraint selection metrics are determined by any mathematical combination of one or more of the following points, or their mathematical equivalents:

the $a_i$-points $\dfrac{b_i a_i}{\|a_i\|^2}$, $i = 1, \ldots, m$;

-continued the $c$-points $\dfrac{b_i c}{a_i^T c}$, $j = 1, \ldots, m$;

the $a^j$-points $\dfrac{c_j a^j}{\|a^j\|^2}$, $j = 1, \ldots n$; or the $b$-points $\dfrac{c_j b}{(a^j)^T b}$, $j = 1, \ldots, n$.

23. The apparatus for allocating resources as recited in claim 19, wherein the possible constraint selection metrics are further determined by a direction $d_r^*$ of appropriate dimension for either the tentative primal or dual objective function.

24. A system for allocating resources using a linear programming model comprising an objective function and a set of model constraints that describe feasible allocations of the resources, the system comprising:
two or more resources;
one or more devices to allocate the resources in accordance with data or instructions received from a controller; and
a controller comprising:
a memory,
an input/output interface that (a) receives data regarding the objective function, the set of constraints and the resources, and (b) transmits data or instructions to allocate the resources, and
a processor communicably coupled to the memory and the input/output interface wherein the processor (a) ranks the model constraints on a constraint selection metric based on at least one criterion from a first group and at least one criterion from a second group, (b) makes an initial selection of one or more of the top ranked model constraints, (c) determines a new problem by adding the selected model constraints to the objective function or a previously determined new problem, (d) determines a tentative resource allocation based on the new problem if the tentative resource allocation exists; (e) if the tentative resource allocation cannot be determined, then terminating the method and reporting that the tentative resource allocation cannot be determined (f) whenever any of the ranked model constraints have not been previously selected: (1) selecting one or more next ranked model constraints that have not been previously selected, (2) if the tentative resource allocation violates the selected next ranked model constraints, repeating step (c) using the selected next ranked model constraints instead of the selected model constraints and steps (d), (e) and (f), and (3) if the tentative resource allocation does not violate the selected next ranked model constraints, repeating step (f), and (g) whenever all the model constraints have been previously selected, provides data or instructions to the input/output interface to allocate the resources in accordance with the tentative resource allocation.

* * * * *